US012367882B1

(12) United States Patent
Leblang

(10) Patent No.: US 12,367,882 B1
(45) Date of Patent: Jul. 22, 2025

(54) SPEAKER DISAMBIGUATION AND TRANSCRIPTION FROM MULTIPLE AUDIO FEEDS

(71) Applicant: Amazon Technologies, Inc., Seattle, WA (US)

(72) Inventor: Jonathan Alan Leblang, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/515,774

(22) Filed: Nov. 21, 2023

Related U.S. Application Data

(63) Continuation of application No. 16/834,742, filed on Mar. 30, 2020, now Pat. No. 11,862,168.

(51) Int. Cl.
*G10L 15/26* (2006.01)
*G10L 21/02* (2013.01)
*G10L 25/78* (2013.01)

(52) U.S. Cl.
CPC .............. *G10L 15/26* (2013.01); *G10L 21/02* (2013.01); *G10L 25/78* (2013.01)

(58) Field of Classification Search
CPC .......... G10L 15/26; G10L 21/02; G10L 25/78
See application file for complete search history.

(56) References Cited

U.S. PATENT DOCUMENTS

| | | | |
|---|---|---|---|
| 7,006,605 B1 | 2/2006 | Morganstein et al. | |
| 9,350,858 B1 * | 5/2016 | Roths | H04M 3/4365 |
| 9,652,113 B1 * | 5/2017 | Colson | G06Q 10/1095 |
| 2004/0083104 A1 * | 4/2004 | Liu | G10L 15/28 |
| | | | 704/245 |
| 2011/0071825 A1 * | 3/2011 | Emori | G10L 25/78 |
| | | | 704/E15.039 |
| 2012/0093338 A1 | 4/2012 | Levi et al. | |
| 2012/0109632 A1 | 5/2012 | Sugiura et al. | |
| 2014/0082106 A1 * | 3/2014 | Scherpa | H04L 65/403 |
| | | | 709/206 |

(Continued)

OTHER PUBLICATIONS

Office Action for U.S. Appl. No. 16/834,742, mailed Jan. 10, 2022, Leblang, "Speaker Disambiguation and Transcription From Multiple Audio Feeds", 64 pages.

(Continued)

*Primary Examiner* — Darioush Agahi
(74) *Attorney, Agent, or Firm* — Nicholson De Vos Webster & Elliott LLP

(57) ABSTRACT

Participants may use one or more devices for engaging in a meeting, such as phones, conferencing devices, and/or computers. The devices include microphones that capture speech for determining the presence of distinct participants. Speech signals originating from different participants, or microphones, may be determined and associated with the participants. For example, microphones may be directional and more sensitive to sound coming from one or more specific directions than sound coming from other directions. By associating an individual with a microphone, or set of microphones, overlapping voices may be disambiguated to provide clear voice streams that aid in producing a clear transcript indicating the speech of the participants, respectively. An identity of the participants may be determined using voiceprint and/or voice recognition techniques.

20 Claims, 11 Drawing Sheets

(56) References Cited

U.S. PATENT DOCUMENTS

| | | | |
|---|---|---|---|
| 2014/0118472 A1 | 5/2014 | Liu et al. | |
| 2014/0136203 A1 | 5/2014 | Liu et al. | |
| 2016/0027442 A1* | 1/2016 | Burton | G10L 15/26 |
| | | | 704/235 |
| 2017/0178630 A1* | 6/2017 | Gummadi | H04M 11/10 |
| 2017/0280235 A1 | 9/2017 | Varerkar et al. | |
| 2017/0358317 A1* | 12/2017 | James | H04W 12/30 |
| 2018/0314689 A1 | 11/2018 | Wang et al. | |
| 2019/0066680 A1 | 2/2019 | Woo et al. | |
| 2019/0318757 A1* | 10/2019 | Chen | G10L 19/022 |
| 2020/0388292 A1* | 12/2020 | Rudberg | H04B 17/309 |
| 2021/0097502 A1 | 4/2021 | Hilleli et al. | |
| 2021/0151058 A1* | 5/2021 | Cheung | G10L 17/00 |

OTHER PUBLICATIONS

Office Action for U.S. Appl. No. 16/834,742, mailed May 27, 2022, Leblang, "Speaker Disambiguation and Transcription From Multiple Audio Feeds", 75 pages.

Office Action for U.S. Appl. No. 16/834,742, mailed on Mar. 3, 2023, Inventor #1 Jonathan Alan Leblang, "Speaker Disambiguation and Transcription From Multiple Audio Feeds".

Office Action for U.S. Appl. No. 16/834,742, mailed on Sep. 21, 2022, Jonathan Alan Leblang, "Speaker Disambiguation and Transcription From Multiple Audio Feeds", 77 pages.

Shoba et al., Adaptive Enegy threshold for monaural speech separation, Apr. 2017, IEEE International Conf on communication and signal processing, 4 pages.

* cited by examiner

SPEAKER DISAMBIGUATION AND TRANSCRIPTION FROM MULTIPLE AUDIO FEEDS

CROSS-REFERENCE TO RELATED APPLICATION

This patent application is a continuation of and claims priority to U.S. Utility patent application Ser. No. 16/834,742, filed Mar. 30, 2020, which is fully incorporated herein by reference.

BACKGROUND

Teleconferencing, or meetings, are used to connect individuals and businesses. Participants may join a meeting using a plurality of devices and, in some instances, participants may share devices. For example, in a conference room, more than one participant may speak into, or listen to audio output by, a conferencing device.

In some instances, meetings are recorded to generate transcripts. As part of the transcription process, it is desirable to disambiguate between speaking participants. For example, understanding what participants say, as well as which participants speak, permits an accurate transcript of the meeting to be generated. This is easily managed in cases where each participant uses an individual device. However, problems arise when participants share a conferencing device and/or speak simultaneously. In such instances, it is difficult to disambiguate between participants and/or associate captured speech with certain participants.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference number in different figures indicates similar or identical items. The systems depicted in the accompanying figures are not to scale and components within the figures may be depicted not to scale with each other.

DETAILED DESCRIPTION

Figure 1:
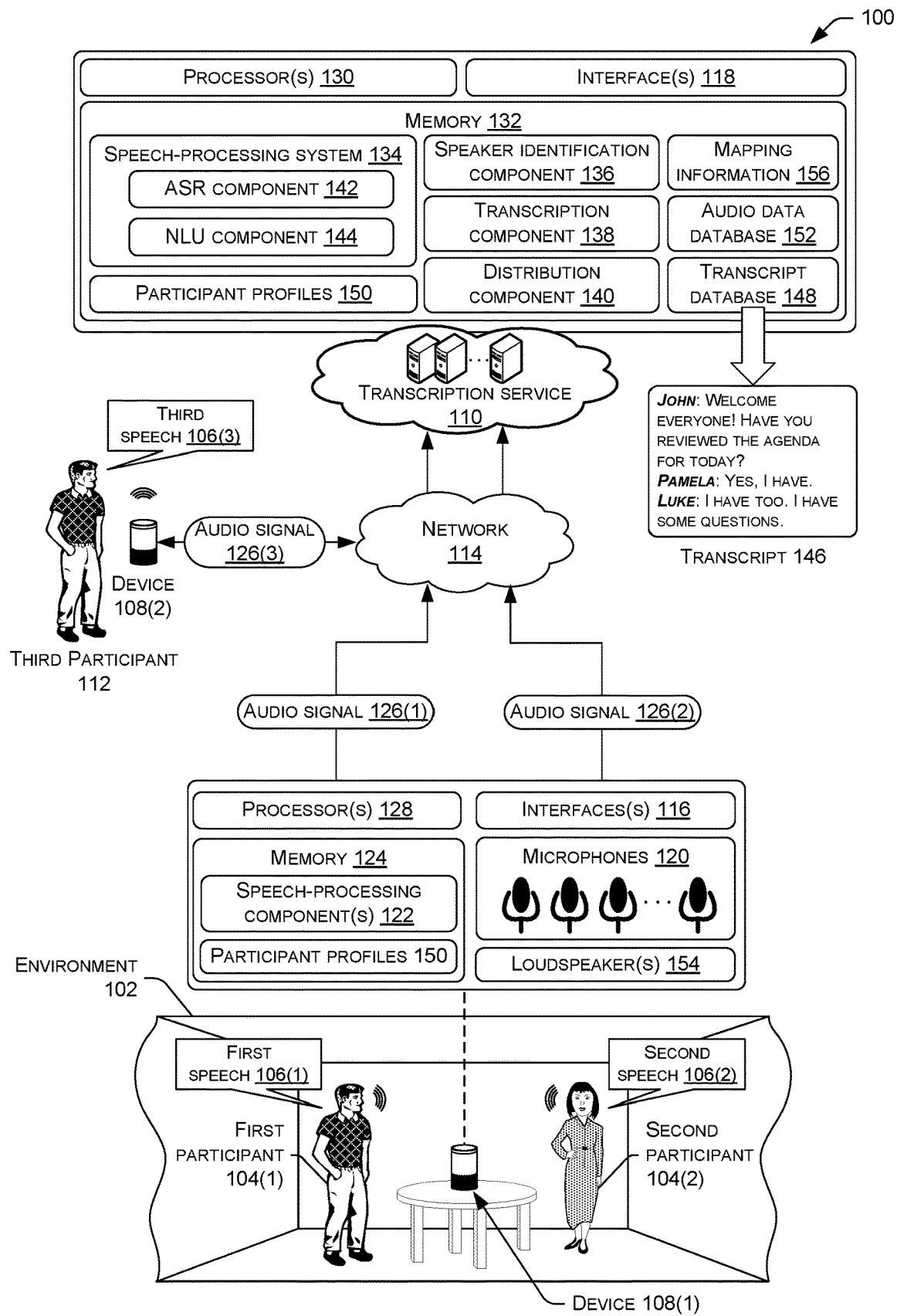
FIG. 1 illustrates an example diagram for generating a transcript using audio data obtained during a meeting, according to an embodiment of the present disclosure. Participants may engage in the meeting using various devices and microphone(s) may capture audio of the participants. Using voice processing, such as beamforming techniques, audio data generated by microphones may be used to disambiguate participant speech from one another. Therein, transcript(s) may be generated and annotated to indicate respective speech of the participants.

As introduced above, in certain situations, it is difficult to disambiguate between simultaneously speaking participants. For example, within a conference room or during a meeting, participants may simultaneously speak into a conferencing device. In such instances, speech from the participants is mixed together, making it difficult to identify a number of participants, which participants are speaking, and/or what each participant said. Voice overlap is therefore a continuing concern for generating transcripts. That is, when participants speak at the same time it is difficult to identify a number of distinct participants within the voice overlap, which participant are associated with which speech, which participants were speaking, and/or an identity of the participants speaking. Further technological improvements may increase user experiences and provide accurate transcriptions.

Described herein, are among other things, systems and methods for processing audio signals, identifying participants within a meeting, and generating a transcript of the meeting (e.g., conference, meeting, virtual session, etc.). Participants may use one or more devices for interacting within the meeting, such as phones, conferencing devices, and/or computers. The devices include microphones that capture speech for determining the presence of distinct participants that are spread across one or more environments. For example, within a conference room, multiple participants may speak simultaneously. In some instances, the multiple participants may be communicatively coupled to a remote device utilized by additional participants(s). To detect which participants are speaking and what each participant says (e.g., associating speech with certain participants), the audio data generated by the microphones may be analyzed or processed. For example, microphones may be directional and have increased sensitivity to sound coming from one or more specific directions than sound coming from other directions. In such instances, a directional response or a beampattern may be formed. Determining the directions of distinct speech allows for the participants to be associated with speech/audio signals (or speech) generated by the microphones, respectively. By identifying the participants, or disambiguating between the speech of the participants, an accurate transcript may be generated. Furthermore, an identity of the participants may be determined using voiceprint and/or voice recognition techniques. This advantageously enables participants to be distinguished from one another, even in instances where the participants move around and/or talk simultaneously.

More particularly, a device may include one or more microphones to generate one or more audio signals indicative of the speech received from participants in an environment, such as a conference room, and speech processing components to process the audio signals. In some situations, participants may speak at the same time, the audio signals may represent the speech of the participants, and to produce a transcript, the speech of each participant may be isolated from one another. To isolate the speech of each participant, or remove unwanted audio from each audio signal, the device may be equipped with a beamforming module, an echo cancellation module, and/or other signal processing components to attenuate audio attributable to an echo, noise, double talk, or speech from other participants. For example, utilizing characteristics of the audio signals generated by the microphones (e.g., energy, signal level, etc.) directions of speech, or a direction from which the speech is received, may be determined. In some instances, using beamforming techniques, directional beams formed by processing audio signals may be used to determine the direction from which the speech originated.

In some instances, beamforming techniques are utilized to analyze the audio signals for determining the presence of speaking participants. Beamforming or spatial filtering is a signal processing technique for directional signal reception. Signals generated by the microphones may be processed in such a way that signals at particular angles experience constructive interference while others experience destructive interference. The beamforming techniques form multiple directional signals corresponding to different directions or orientations within the environment associated with speech. As the speech is received from a particular direction, the directional signal (e.g., formed beam) associated with that direction tends to exhibit more energy or signal strength than the other signals (or beams), thereby arriving at the direction of the participants, respectively. The beam that exhibits the greatest energy is selected and a direction to the participant is determined from that beam. This process may repeat to determine the direction, presence, position, or location of each participant within the environment.

For example, as the microphones receive audio, the directional beams formed by processing signals may indicate a direction of the participants within the environment (i.e., as sources of sound). Given that the direction tends to exhibit more energy or signal strength than the other signals (or beams), participants within the environment may be determined. In this manner, the audio signals generated by a respective microphone may be processed using the audio signals from other microphones to determine a presence of each participant, and attenuate speech of other participants. This process may repeat to determine the presence of distinct participants within the environment, or to disambiguate the participants from one another. In another implementation, directionality or the presence of different participants may be ascertained by measuring time differences when the participant speech reached the microphones.

By way of example, envision that the environment includes a first participant and a second participant. As the first participant and the second participant speak, the microphones generate audio data indicative of the speech, and transmit audio signals representative of the audio data (or speech). However, a first microphone located closest to the first participant may detect the audio of the first participant first compared to remaining microphones. Additionally, the first microphone may detect an increased energy or signal level compared to the remaining microphones. This determination may indicate the presence of the first participant adjacent or proximal to the first microphone. Similarly, a second microphone located closest to the second participant may detect the audio of the second participant first and/or may detect the audio of the second participant at an increased energy or signal. As such, given that speech is directional and attenuates over distance, beamforming techniques may be used to identify the presence of the first participant and the second participant, or that there are two participants within the environment. In some instances, voice processing techniques such as same voice detection may be used for determining the presence of multiple participants. For example, the device (or a communicatively coupled device) may compare the audio data (and/or signals) generated by the first microphone and the second microphone to determine similarities and/or differences therebetween. These similarities and/or differences may indicate or be used to determine the number of distinct participants within an environment and to disambiguate the participants from one another.

By identifying the participants, or disambiguating the speech of each participants, the audio signals (or data) may be attenuated to isolate the speech of each participant. In such instances, the audio processing techniques may filter out or attenuate noise to generate a processed audio signal that represents or determines speech of each participant. Therein, the processed audio signal may substantially represent the speech of a single participant. For example, continuing with the above example, as the first microphone may be located closest to the first participant, the speech of the second participant may be attenuated from the audio signal generated by the first microphone. In some instances, the audio data generated and the audio signals transmitted by the other microphones may be utilized to isolate the speech of the first participant. For example, the audio data generated by the second microphone, or other microphones of the device, may be used to attenuate the speech of the second participant from the audio data generated by the first microphone (e.g., using same voice detection). As a result, the speech of the first participant may be isolated from the speech of the other participants in the room. This process may repeat to identify the number of participants in the environment.

In some instances, other audio signal processing modules may be implemented to reduce noise, identify same voice, double-talk, echo, and/or to attenuate any signal components associated with noise other than the associated participant. In turn, after processing the audio signals, a clean-high quality audio signal may be generated for each participant. Such processed audio signals, that represent or correspond to the speech of a single participant, may be used when generating the transcript.

In some instances, certain microphones may be associated with respective participants. In future instances, the identification of or disambiguation between the participants may be determined though the association of the participants with the microphones. For example, after determining that the first microphone first receives or captures the audio of the first participant, and/or at the highest energy level, the first microphone may be associated with the first participant. Similarly, after determining that the second microphone first receives or captures the audio of the second participant, and/or at the highest energy level, the second microphone may be associated with the second participant. As the microphones continue to receive audio, audio corresponding to the first participant may be determined (or identified) and audio corresponding to the second participant may be determined (or identified). Moreover, processing techniques may attenuate noise and/or audio from the other participants, such that the processed audio signal from the first microphone substantially represents the speech of the first participant. In some instances, mapping information may be used to assign the audio data to respective participants.

In some instances, participants may be associated with virtual microphones. For example, if a particular device or environment includes two microphones, but three participants, one or more of the participant(s) may be associated with virtual microphones that represent a combination of actual microphones. For example, a third participant may be associated with fifty percent of the first microphone and fifty percent of the second microphone, in instances where the third participant is halfway between the first microphone and the second microphone. If the third participant moves closer to the first microphone, then the third participant may be associated with eighty percent of the first microphone and twenty percent of the second microphone. Here, this "virtual" microphone may then be associated with the third participant. That is, because the device or the environment includes more participants than microphones, these virtual microphones may be associated with respective participants. In turn, the virtual microphones may be used to generate audio data that represents the speech of the third participant. For example, the device (or a communicatively coupled device), may use eighty percent of the output of the first microphone and combine that with twenty percent of the output of the second microphone to generate an audio signal that represents the speech of the third participant.

After microphones receive and/or generate audio data, and/or after the devices process the audio data using beamforming or other techniques, the device may transmit audio signals to a remote system, speech processing service, or transcription service. By transmitting each of the audio signals, separately, which substantially corresponds to speech of a single participant, the transcription service may process the audio signals to determine words associated with the speech of each participant. That is, by transmitting the audio signals of each microphone, the transcription service may determine the speech of each participant by analyzing the individual audio signals. However, in some instances, the transcription service may perform signal processing to determine the number of participants within the environment and/or to disambiguate the speech of the participants using the audio data captured at the microphones. In some instances, the transcription service may verify the number of participants determined by the device. For example, the transcription service may receive audio signals from the device to determine the number of distinct participants and/or to disambiguate the speech of the participants, for verifying and/or confirming the determination made at the device.

After processing the audio signals, the transcription service may generate a transcript of the meeting. For example, using the processed audio signals, the utterances, words, phrases, or speech of the participants may be determined. Knowing which participants spoke, which audio is associated with each participant, as well as their respective utterances, allows for an accurate transcript of the meeting to be generated. That is, by using the directional microphones to determine the participants, or identifying the participants within the environment, the transcript may identify which participants spoke and their respective speech.

At this point, the first microphone may be associated with the first participant and the second microphone may be associated with the second participant. Additionally, participants may be associated with virtual microphones. That is, after attenuating noise, the speech of the first participant and the second participant may be determined, respectively. In some instances, after associating participants with the microphones, an identity of the participants may be determined. To determine an identity of the participants, audio signatures (e.g., acoustic fingerprint, voice signature, voiceprint, etc.) associated with the audio signals may be compared against audio signatures stored in association with participant profiles. For example, an audio signature of the audio signal corresponding to the first participant may be compared against stored audio signatures to determine an identity of the first participant. Each signature may uniquely identify a participant's voice based on a combination of one or more of a volume, pitch, tone, frequency, and the like. If a similarity between the audio signal and a stored audio signature is greater than a threshold, an identity of the participant may be determined (e.g., using an identifier associated with the stored audio signature).

Knowing the identity of the participants allows for the transcript to be annotated. For example, after comparing the audio signatures, the identity or name of the first participant may be John and the identity or name of the second participant may be Pamela. Therein, the transcript may indicate speech corresponding to John and speech corresponding to Pamela, respectively.

In some instances, the identity of the participants may also be used to indicate to other participants within the meeting the identity of the speaking participant. For example, if John and Pamela are in a conference room, and another participant is located at a remote location, an indication may be provided to the other participant (e.g., a device with which the other participant is using) to indicate whether John and/or Pamela is/are speaking. In this sense, the other participants may receive an indication of which participants, among the participants in the meeting, is/are speaking.

In some instances, the transcript may be utilized to determine one or more action item(s) or task(s). For example, the transcription service may be configured to analyze the transcript to identify commands of the participants, and perform, in some examples, along with one or more other computing devices, various operations such as scheduling meetings, setting reminders, ordering goods, and so forth. As the transcripts identify which participant spoke, or which portion of the transcript was spoken by the participants, task(s) may be created. For example, during the meeting, the first participant (e.g., John), may utter a phrase, such as "Please remind me to schedule a company meeting." After associating this speech (or request) with John, an action item may be generated for John that reminds him to schedule a meeting. Accordingly, knowing the identity of the participants allows for a complete transcript to be generated, indicating participants spoke, what the participants said, as well as to associate commands, or action item(s), with each participant.

As discussed above, the devices may include various components to process audio, such as speech-processing components, to analyze speech of the participants. In some examples, the devices may have relatively low functionality with respect to processing the audio. For example, the devices may include pre-processing components to perform less complicated processing on the audio, such as beam-forming components, echo-cancellation components, wake-word detection components, and so forth. Additionally, and/or alternatively, in some instances, the devices may be configured to perform speech recognition, such as automatic speech recognition (ASR), natural language processing (NLP), and/or natural language understanding (NLU), on the audio signals to identify words or phrases associated with the speech of the participant(s), as well as an intent associated with the words or phrases, or may be configured to provide the audio data to another device (e.g., a remote service such as remote system for performing the ASR, NLU, and/or NLP on the audio data). In such examples, the devices may serve as an interface or "middle man" between a remote system and the participants. In this way, the more intensive processing involved in speech processing may be performed using resources of the remote systems, which may increase the performance of the speech-processing techniques utilized on audio data generated by the devices. For example, while the devices may be configured with components for determining metadata associated with the audio data (e.g., SNR values, timestamp data, etc.), in some examples the devices may relay audio signals to the transcription service which performs processing techniques to determine the identity of participants and/or generate a transcript. The remote system may perform ASR on the audio signals to identify speech, translate speech into text, and/or analyze the text to identify intents, context, commands, etc. Therein, the transcript may be generated as a result of the speech processing. However, any combination of processing may be performed by the devices and/or the remote system to generate the transcript of the meeting.

Although the above discussion relates to determining the presence or identification of two participants sharing a device within an environment, the techniques discussed herein may be utilized to identify any number of participants within the environment, or associating audio with any number of participants. Still, environments may include more than one device that captures speech. For example, external microphones may be coupled to a device for capturing audio of the participants. In such instances, the audio data generated by the microphone(s), of each device, may be processed and compared to determine a number of participants engaged in the meeting and to disambiguate their respective speech from one another to generate a transcript of the meeting. Still the transcription service may receive audio signals from any number of devices for use in generating transcripts. For example, the transcription service may receive audio signal(s) from another device operated by a third participant engaged in the meeting. Therein, the transcript may indicate the speech of the first participant, the second participant, and the third participant, respectively. The transcription service may therefore receive audio signals from any number of devices, associated with one or more participants, and across one or more distinct environments, for generating transcripts of the meeting. Therein, the transcript may be distributed to the participants and/or actions item(s) may be identified.

As such, the present disclosure is directed to generating transcripts of a meeting and determining respective participants associated with speech uttered during the meeting. In some instances, the audio obtained during the meeting may be processed to filter noise and obtain clean (high-quality) audio data for use in generating a transcript. In this sense, the audio data (or signals) may be compared to one another in an iterative process to identify the number of distinct participants, and generate processed audio signals that represents the speech of the respective participants. Therein, in some instances, the individual audio streams or audio data generated by the microphones may be processed to identify the participants (e.g., speakers) corresponding to the audio data. For example, audio signatures associated with the participants may be compared against those of the participants to annotate the transcript.

The present disclosure provides an overall understanding of the principles of the structure, function, device, and system disclosed herein. One or more examples of the present disclosure are illustrated in the accompanying drawings. Those of ordinary skill in the art will understand and appreciate that the devices, the systems, and/or the methods specifically described herein and illustrated in the accompanying drawings are non-limiting embodiments. The features illustrated or described in connection with one embodiment, or instance, may be combined with the features of other embodiments or instances. Such modifications and variations are intended to be included within the scope of the disclosure and appended claims.

FIG. 1 illustrates a schematic diagram 100 of an illustrative environment 102 in which participants engage in a meeting using one or more devices. For example, within the environment 102, a first participant 104(1) and a second participant 104(2) may utter first speech 106(1) and second speech 106(2), respectively. A device 108(1) within the environment 102 detects the first speech 106(1) and the second speech 106(2). In this example, the environment 102 may be a room or an office and the first participant 104(1) and the second participant 104(2) may interact with the device 108(1). In some instances, collectively, the first participant 104(1) and the second participant 104(2) may be referred to herein as "the participants 104" which utilize the device 108(1) for engaging within the meeting. However, although the environment 102 is shown including two participants, the environment 102 may include any number of participants (e.g., three, four, five, etc.) and the techniques and processes discussed herein may extend to identify or disambiguate between the participants.

The device 108(1) may communicatively couple to a transcription service 110 that functions to generate transcripts of the meeting. The transcription service 110 may also act as a host for the meeting and/or distribute content or media source(s) (e.g., audio, video, etc.) to other participants within the meeting. For example, the transcription service 110 may allow the participants 104 to communicate with a third participant 112 located remote from the environment 102 and interacting with a device 108(2). However, in some instances, the meeting may only include the participants 104 within the environment 102, and the participants 104 may not engage with remote participants (i.e., the third participant 112). In some instances, the device 108(2) may include similar components and/or a similar functionality as the device 108(1). In some instances, the device 108(1) and the device 108(2) may be collectively referred to herein as "the devices 108" or individually, "the device 108."

The devices 108 may be communicatively coupled to the transcription service 110 and one another over a network 114. The network 114 may include any viable communication technology, such as wired and/or wireless modalities and/or technologies. The network 114 may include any combination of Personal Area Networks (PANs), Local Area Networks (LANs), Campus Area Networks (CANs), Metropolitan Area Networks (MANs), extranets, intranets, the Internet, short-range wireless communication networks (e.g., ZigBee, Bluetooth, etc.) Wide Area Networks (WANs)—both centralized and/or distributed—and/or any combination, permutation, and/or aggregation thereof.

As introduced above, the first participant 104(1), the second participant 104(2), and the third participant 112 may engage in the meeting. The meeting may include video and/or audio conferencing, communication sessions, teleconferencing, and/or other online environments in which participants communicate with one another (e.g., chat rooms) either remotely or at the same location. In FIG. 1, the participants 104 are shown communicating with the third participant 112 via the device 108(1). The device 108(1) may be configured to provide feedback or messages to the participants 104, such as speech of the third participant 112. In some instances, the device 108(1) may be configured to record audio and/or video of the meeting, or of the participants 104, for generating transcripts of the meeting between the participants 104.

The devices 108 may be one or more devices, such as but not limited to a smart phone, a smart watch, a personal computer ("PC"), desktop workstation, laptop computer, tablet computer, notebook computer, personal digital assistants ("PDA"), electronic-book reader, game console, set-top box, consumer electronics device, server computer, a telephone, a telephone conferencing device, video conferencing device, or any other type of computing device capable of connecting to the network 114. Interface(s) 116 of the device 108(1) and interface(s) 118 of the transcription service 110 are also provided to facilitate connection to, and data transmission over, the network 114.

The device 108(1) is equipped with an array of microphones 120 for capturing verbal input, utterances, or speech (e.g., the first speech 106(1) and the second speech 106(2)) of the first participants 104, as well as any other sounds in the environment 102. Although multiple microphones 120 are discussed, in some instances, the devices 108 may be embodied with only one microphone. Additionally, the microphones 120 may be external microphones that are not physical components of the device 108(1), but which are communicatively coupled to the device 108(1) (e.g., Bluetooth or hard-wired, such as USB, A/V jack, etc.). The device 108 may utilize same voice or speech detection, beamforming, and noise cancellation functions to provide individual audio streams to the transcription service 110 so that automated transcriptions are better facilitated. For example, the device 108(1) may include speech-processing component(s) 122 stored within memory 124 of the device 108(1) and which process audio signal representations of the speech received or captured by the microphones 120. Processor(s) 128 may power the components of the device 108(1), such as components stored in the memory 124, and/or perform various operations described herein. In some instances, the speech-processing component(s) 122 may include a wake word engine, speech recognition, natural language processing, echo cancellation, noise reduction, beamforming, and the like to enable speech processing.

In instances where multiple participants share a device, such as in the environment 102, audio processing techniques may be utilized to distinguish participants from one another. As the participants 104 within the environment 102 speak, each of the microphones 120 may generate corresponding audio data and/or audio signals. The device 108(1) detects when the participants 104 begin talking and the microphones 120 may each receive audio of the participants 104 at different times and/or at different energy levels. These characteristics may be used to ascertain the direction of the participants 104 or discrete sources of sound within the environment 102. In one implementation, the speech-processing component(s) 122 may include a beamforming module or component used to process audio signals generated by the microphones 120. Directional beams formed by processing the audio signals may be used to determine the direction from which the speech originated. Therein, sources of sound may be determined, and these sources may be associated with respective the participants 104 in the environment 102. In another implementation, directionality may be ascertained by measuring time differences as to when utterances of the participants 104 reach the microphones 120. For example, as the first participant 104(1) speaks, a first microphone of the microphones 120 located closest to the first participant 104(1) may first detect the first speech 106(1) of the first participant 104(1). The remaining microphones 120 may receive the first speech 106(1) at various delays, or offsets.

Additionally, the first microphone located closest to the first participant 104(1) may detect audio of the first speech 106(1) at an increased energy or signal level. For example, the speech-processing component(s) 122 may identify the participants 104 based upon the power level from each of the microphones 120. In some instances, the speech-processing component(s) 122 may compute the power level of the audio signals from microphones 120 and rank order them in decreasing order of signal power. The speech-processing component(s) 122 may then select or identify a predetermined number of microphones with the greatest signal power. Each one of the identified microphones 120 may then be associated with one of the participants 104. This determination may indicate that the first participant 104(1) is speaking, or a direction of the first participant 104(1) relative to the device 108(1). This process may repeat for the speech captured by the remaining microphones 120 to determine the presence of additional participant within the environment 102, such as the second participant 104(2). As such, within the environment 102, the presence of distinct participants may be determined as well as their relative location or direction from the device 108(1). In some instances, the audio processing techniques may involve same voice detection for identifying similar speech within the audio signals and determining a discrete number of participants.

For example, the audio data generated by the microphones 120 may be compared with one another to determine similarities and/or differences. By comparing frequencies, pitch, amplitude, and/or other characteristics of the audio data and/or signals, similarities and/or differences may be determined. By identifying the similarities and/or differences, this comparison may indicate the number of discrete sources of sound within the environment 102. These discrete sources of sound may be used to indicate the presence of the number of participants within the environment 102. As such, by comparing characteristics of the audio data and/or signals, the speech of the participants 104 may be disambiguated from one another and the number of participants may be determined.

Moreover, in instances where the participants 104 speak at the same time, each of the microphones 120 may generate respective audio representing the speech of the participants 104. Noted above, beamforming or other audio processing techniques may be used to determine that two participants are speaking simultaneously, based on the comparison and/or processing of the audio (or signals). Determining a presence of the participants 104, or distinguishing the speech between the participants 104, allows for the differentiation of the participants 104 within the environment 102. The device 108(1) may therefore include components that adaptively "hone in" on active participants and capture speech signals emanating therefrom. This improves the perceptual quality and intelligibility of such speech signals, even in instances where the participants 104 are moving around the environment 102 in which the device 108(1) is being utilized, or when two or more active participants are speaking simultaneously.

In some instances, once the participants 104 are distinguished from one another, the participants 104 may be associated with corresponding audio signals generated by the microphones 120 and/or associated with respective microphones 120. The audio data (or signal) generated by a microphone closest to the participants 104 may be selected for speech processing. For example, continuing with the above example, the first microphone and the second microphone may be respectively chosen based on their corresponding audio having the highest signal strength of the first participant 104(1) and the second participant 104(2), respectively. The first microphone may be associated with the first participant 104(1) and the second microphone may be associated with the second participant 104(2). The audio data generated by the first microphone may be processed for determining speech of the first participant 104(1), while the audio data generated by the second microphone may be processed for determining speech of the second participant 104(2). Therein, the speech-processing component(s) 122 may attenuate noise to isolate the speech of the participants 104 within the environment 102.

However, noted above, participants may be associated with virtual microphones in instances where the environment 102 includes a greater number of participants than microphones (e.g., not every participant may be associated with a physical microphone). Here, virtual microphones may be associated with the participant(s), such that the speech of the participants may be determined using a combination of the audio data generated by the microphones 120. For example, the speech of an additional participant within the environment 102 may be generated using certain a combination of the audio data generated by the microphones (e.g., forty percent of the first microphone and sixty percent of the second microphone). Virtual microphones therefor allow for a combination of microphones to be used to generate audio data associated with additional participants in the environment 102.

In some instances, the speech-processing component(s) 122 may filter out or attenuate noise to generate a processed audio data or signal that substantially represents speech of each of the participants 104. For example, as the first microphone may be located closest to the first participant 104(1), the speech of the second participant 104(2) may be attenuated from the audio data generated by the first microphone (or using other audio data generated by additional microphones in the environment 102). In some instances, this may be accomplished using echo cancellation, same voice detection, noise reduction, and/or other techniques. In other words, as the speech of the second participant 104(2) may be received at the first microphone, this speech may be attenuated from the audio data generated by the first microphone to obtain processed audio data that substantially represent the speech of the first participant 104(1). As a result, the speech of the first participant 104(1) may be isolated from that of the other participants in the environment. Therein, by processing the audio data, a clean-high quality audio signal may be generated for each of the participants 104.

In some instances, after determining the presence of the participants 104 within the environment 102, and which microphones are closest or associated with the participants 104, respectively, the device 108(1) may transmit audio signals to the transcription service 110 for advanced signal processing. In some instances, the advanced signal processing performed by the transcription service 110 may better sort out the speech in the environment 102, and thus, an increase in the quality of the transcripts. In some instances, the device 108(1) separately transmits the audio signals to the transcription service 110 over the network 114. For example, in instances where the device 108(1) detects two participants (i.e., the participants 104), the device 108(1) may transmit, to the transcription service 110, audio signal 126(1) generated by the first microphone and audio signal 126(2) generated by the second microphone. That is, after determining which audio data generated by the microphones 120 corresponds to different participants, the device 108(1) may transmit an audio signal representative of the audio data, separately, to the transcription service 110.

However, in some instances, the device 108(1) may transmit all of the audio data generated by the microphones 120, respectively. For example, in instances where the device 108(1) includes four microphones 120, the device 108(1) may separately transmit first, second, third, and fourth audio signals generated by the microphones 120. Therein, the transcription service 110 may identify the audio associated with each participant, or which microphones are associated with participants 104. Additionally, or alternatively, in some instances, the device 108(1) may transmit the audio signals captured by the microphones 120 as a packet to the transcription service 110. The audio signals may be embedded with metadata that indicates or identifies which portions of the audio corresponds to the audio signal 126(1), the audio signal 126(2), and so forth. In some instances, the device 108(1) may process the audio generated by microphones 120 using the speech-processing component(s) 122 in whole or in part. In some cases, some or all of the speech processing is performed by the transcription service 110. Accordingly, in some instances, the device 108(1) may send audio signals or data, or a partial processed version of the audio signals or data, to the transcription service 110, where the audio signals or data are more fully processed.

In some instances, the transcription service may perform a verification stage to check or confirm the processing performed by the device. For example, the device 108(1) may determine the presence of two participants within the environment 102, and correspondingly, transmit the audio signals 126(1) and 126(2) to the transcription service 110. Additionally, or alternatively, the device 108(1) may transmit audio signals generated by all microphones of the device 108(1), and/or the transcription service 110 may receive audio signals from all microphones in the environment 102. Therein, the transcription service 110 may utilize the audio signals for determining the number of distinct participants in the environment 102 to confirm or correct the determination made by the device 108(1). As such, the transcription service 110 in some instances may function to confirm the processing and/or results of the device 108(1).

The transcription service 110 may include cloud services hosted, for example, on one or more servers. These servers may be arranged in any number of ways, such as server farms, stacks, and the like that are commonly used in data centers. In some examples, the transcription service 110 may include one or more processor(s) 130 and memory 132 storing various components. The processor(s) 130 may power the components of the transcription service 110, such as components stored in the memory 132. The transcription service 110 may include components such as, for example, a speech-processing system 134, a speaker identification component 136, a transcription component 138, and/or a distribution component 140 for performing the operations discussed herein. It should be understood that while the speech-processing system 134 and the other components are depicted as separate from each other in FIG. 1, some or all of the components may be a part of the same system.

The speech-processing system 134 may receive the audio signal 126(1) and the audio signal 126(2) from the device 108(2) for processing. Additionally, the speech-processing system 134 may receive audio signal 126(3) generated by the device 108(2) (or the microphone(s) of the device 108(1)), that represents third speech 106(3) of the third participant 112. However, as shown, the third participant 112 may be the only participant utilizing the device 108(2), and thus, speech or audio received from the device 108(2) may be associated with the third participant 112.

The speech-processing system 134 may include an automatic speech recognition component (ASR) 142 and/or a natural language understanding component (NLU) 144. For example, the ASR component 142 may process the audio signal 126(1)-(3) to generate textual data corresponding to the first speech 106(1), the second speech 106(2), and the third speech 106(3), respectively. In some examples, the ASR component 142 may generate ASR confidence scores representing the likelihood that a particular set of words of the textual data matches those uttered in the speech 106(1)-(3), respectively. For example, the ASR component 142 may determine a confidence or likelihood that a particular word which matches the sounds would be included in the sentence at the specified location (e.g., using a language or grammar model). Thus, each potential textual interpretation (e.g., hypothesis) of the first speech 106(1), the second speech 106(2), and the third speech 106(3) is associated with an ASR confidence score. The ASR component 142 may then return the textual data and, in various examples, the textual data may be sent to the NLU component 144 to be analyzed or process. The NLU component 144 ay determine an intent or otherwise assist in determining contextual information of the first speech 106(1), the second speech 106(2), and/or the third speech 106(3). For example, if during the meeting the first participant 104(1) issued a command such as "schedule a meeting with Bob," the NLU component 144 may determine that the intent of the first participant 104(1) is to schedule a meeting with Bob.

After ASR and/or NLU processing, the transcription service 110 may generate a transcript 146 of the meeting between participants, such as the first participant 104(1), the second participant 104(2), and the third participant 112. In some instances, the transcription service 110 may include a transcription component 138 for generating the transcript 146, and which utilizes the audio signal 126(1)-(3). In some instances, the transcription component 138 may generate the transcript 146 after ASR and/or NLU processing has been performed. By receiving the individual audio streams of the microphones 120, or the audio signal 126(1)-(3) separately, the transcription service 110 may generate transcripts that represent the speech of each of the three participants within the meeting. For example, by separating or disambiguating the speech of participants, the respective speech of the first participant 104(1), the second participant 104(2), and the third participant 112 may be determined. In some instances, after separately determining the transcript of the participants individually, the transcription service 110 may generate the transcript 146, which combines the respective speech of the participants engaged within the meeting. In doing so, time stamps may be compared such that the transcript 146 represents a chronological order of the dialogue or discussion that took place during the meeting. For example, as shown in FIG. 1, the transcript 146 may individually identify the participants and their associated words, phrases, or speech.

The transcript 146 may be stored within a transcript database 148, which includes transcripts of meetings. In some instances, the participants may access the transcripts 146 within the transcript database 148 or the transcripts 146 may be automatically sent to participants after the meeting has concluded. The transcripts 146 may also be sent to people who were unable to attend the meeting. In some instances, the transcript 146 may be generated at the conclusion of the meeting, or may be generated in real time as the meeting is in progress.

The audio signal 126(1)-(3) may be utilized by the devices 108 and/or the transcription service 110 to perform speaker identification and/or determining the presence of distinct participants. For example, the speaker identification component 136 may obtain speech signals (e.g., the audio signal 126(1)-(3)) originating from different participants to identify a particular participant associated with each speech signal. This identification may generate information used to assign each speech signal with an identified participant.

As shown, the memory 132 may store or otherwise have access to participant profiles 150, which include various data associated with participants engaged in the meeting. The memory 124 of the device 108(1) may further store the participant profiles 150. In some instances, the participant profiles 150 may include data relating to schedules of participants, identifiers associated with participants (e.g., username), devices of participants, contact information (e.g., email), and so forth. The schedules may be accessed for use in determining which participants are engaged in the meeting (e.g., meeting invite), which may further be used to assist in identifying which participants are speaking. Additionally, a given participant profile 150 may include one or more reference audio signatures that may be distinctive to the participant associated with the participant profile 150. The one or more reference audio signatures may be used to identify which participants are speaking to the devices 108, respectively, which participants are associated with respective audio data (or signals) received from the device 108(2), or which participants are associated with respective audio data (or signals) generated by the microphones 120 of each device.

For example, in some instances, the speaker identification component 136 may analyze a sample audio signature from the audio signal 126(1)-(3) in association with the reference audio signatures to determine whether the sample audio signature corresponds to at least one of the reference audio signatures. A confidence value associated with such a determination may also be determined. In some instances, the participant profiles 150 may be queried for the reference audio signatures and a candidate set of reference audio signatures may be identified. The speaker identification component 136 may then analyze the candidate set of reference audio signatures against the sample audio signature from the audio signal 126(1)-(3) to determine a confidence value associated with how closely the sample audio signature corresponds to each or some of the reference audio signatures. The reference audio signature with the most favorable confidence value may be selected and may indicate which participant profile 150 the audio data is associated with. Therein, a predicted or presumed identity of the participant may be determined.

Upon determining the identity, the transcript 146 may be updated to indicate which speech corresponds to respective participants. For example, the speaker identification component 136 may determine that the first participant 104(1) includes a first identity of John, the second participant 104(2) includes a second identity of Pamela, and the third participant 112 includes a third identity of Luke. After determining the identity, as shown in FIG. 1, the transcript 146 may indicate speech associated with each of the participants.

In some instances, the transcript 146 may be parsed to identify key words that indicate an action item(s). For example, after the meeting, action item(s) or task(s) may be created for participants that represent follow-up tasks that are to be performed by participants of the meeting, respectively (e.g., schedule meeting, book trip, etc.).

In some instances, in addition to performing beamforming or other audio processing techniques to determine the presence of distinct participants within the environment 102, or distinguish between speech of the participants 104 within the environment 102, the transcription service 110 may compare the audio signatures of the audio signal 126(1) and the audio signal 126(2). For example, the transcription service 110 may analyze the audio signal 126(1) and the audio signal 126(2) against audio signatures to determine the presence of different participants within the environment 102. In this sense, the techniques discussed herein may use beamforming techniques and/or speaker identification techniques for determining the presence of the participants 104 within the environment 102, that multiple participants are utilizing the device 108(1) within the environment 102, or to otherwise disambiguate speech emanating within the environment and which is generated by the participants 104, respectively.

The memory 132 of the transcription service 110 is further shown including an audio data database 152 that stores audio data (e.g., the audio signal 126(1)-(3)) received from the devices 108. The audio data database 152 may therefore store a recording of the meeting for use in generating the transcript 146. Additionally, the transcription service 110 may store other forms of content or media associated with the meeting, such as video data.

As discussed above, the transcription service 110, or systems and/or components thereof, supports communications between participants engaged in the meeting. The transcription service 110, or another system and/or service, may function to deliver audio, or other forms of media sources, to devices within the meeting. For example, the transcription service 110 is shown including the distribution component 140 for distributing media source(s) (or content) amongst participants of the meeting, such as the devices 108. The distribution component 140 may receive the audio signal 126(3) from the device 108(2) and transmit the audio signal 126(3) to the device 108(1) for output. The device 108(1) may include loudspeaker(s) 154 for outputting the audio signal 126(3), or may include other output components (e.g., display, lights, etc.). The loudspeaker(s) 154 may be physical components of the device 108(1) and/or the loudspeaker(s) 154 may be coupled to the device 108(1) through wireless or wired communication (e.g., Bluetooth, USB, etc.). The device 108(1) may also be connected to home audio systems for outputting audio.

The transcription service 110 may store mapping information 156 in the memory 132, which may include information that maps each audio signals associated with each identified participant received by the transcription service 110 to a corresponding microphone within the environment 102 (or other environments). That is, as noted above, each of the participants may be associated with, or mapped to, a respective microphone or associated with respective audio signals received from the microphones 120 of the devices 108, respectively. Upon receiving audio signals, the transcription service 110 may access the mapping information 156 to associate the audio signals with respective participants within the meeting. The mapping information 156 may also store information associated with the virtual microphones, or what combination of microphone(s) (or audio data generated therefrom) is associated with respective participants.

Additionally, in some instances, other inputs and/or data may be used for determining the presence and/or identity of the participants 104. For example, the devices 108 or the environments may include cameras that capture image data of participants for use in determining a number of participants, which participants speak, and/or an identity of participants. In some instances, the devices 108 may transmit the image and/or video data to the transcription service 110 indicating the participants speaking. This image and/or video data may then be used to associate content within the transcript 146 with the correct participant. In some instances, the transcription service 110 may perform facial recognition analysis to identify the participants and speakers of the meeting.

In some instances, if the devices 108 and/or the transcription service 110 is unable to distinguish between the participants 104, or is unable to recognize different participants within the environment 102, the device 108(1) may output commands and/or instructions. For instance, the device 108(1) may output a request for the participants 104 to move apart from one another (e.g., spatially distribute), for the participants 104 to speak one at a time, or may ask the participants 104 to state his or her name. After such, the device 108(1) may be able to disambiguate between the participants 104 and/or recognize the presence of the different participants 104. In some instances, at the start of the meeting, the participants 104 may individually identify themselves and the microphone 120 closest to the respective participants may be associated for participant identification.

In some instances, the device 108 may display certain appearance states based on the identity of participants, or which participant(s) are speaking. For example, the device 108 may include lighting elements that illuminate to different colors and/or patterns based on which participant is speaking. Such indications may be used to inform other participants in the meeting which participant is speaking and/or the identity of that participant(s). In some instances, the device 108 may additionally or alternatively include a display that presents identifying information of the speaking participant.

In some instances, the transcription service 110 may generate translations for output or output audio interpretations in instances where participants of the meeting speak in more than one language. For example, if some participants speak English and some participants speak Italian, the transcription service 110 may translate the audio data, generate translated audio data that represents an interpretation of that audio data, and then transmit the translated audio data to the devices in the meeting for rebroadcasting. This rebroadcasting may translate the speech of participants into a common language for understanding by the participants in the meeting.

Figure 2:
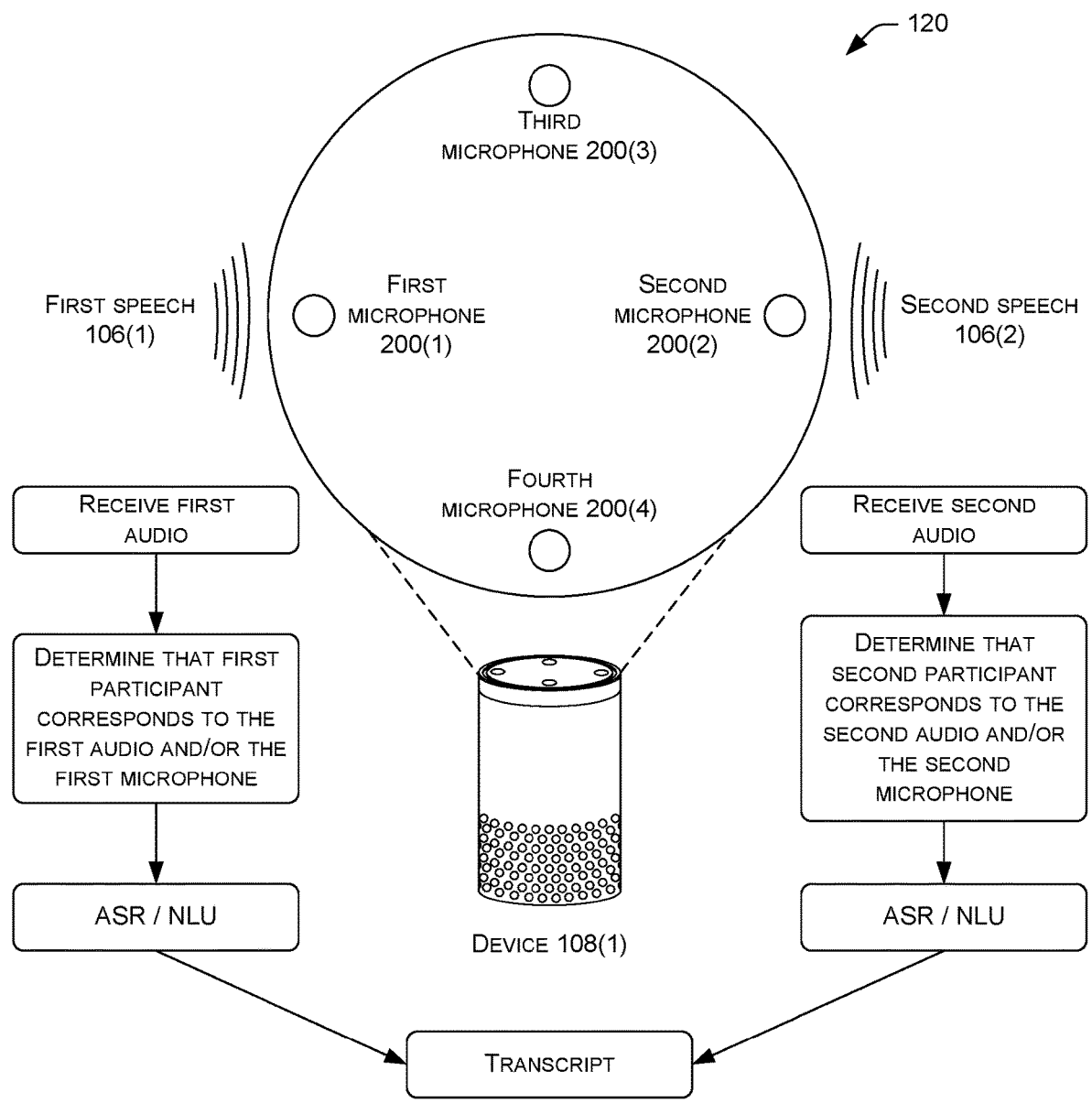
FIG. 2 illustrates an example device for obtaining audio data used to generate a transcript, according to an embodiment of the present disclosure.

FIG. 2 illustrates the device 108(1), or an example device, for capturing audio within a meeting. Using the audio, the transcript 146 of the meeting may be generated.

As shown, the device 108(1) may include four microphones 120 spatially distributed or around a top (or first end) of the device 108(1). The microphones 120, in some instances, may include a first microphone 200(1), a second microphone 200(2), a third microphone 200(3), and a fourth microphone 200(4). The audio data, or audio signals, generated by the microphones 120 may be utilized to identify discrete sources of sound emanating within the environment 102, such as the first participant 104(1) and the second participant 104(2). For example, beamforming techniques may be used to identify that the environment 102 includes the first participant 104(1) and the second participant 104(2), or that the first participant 104(1) and the second participant 104(2) are speaking simultaneously. Additionally, spatially distributing the microphones 120 may assist in identifying the participants 104 and/or disambiguating the participants 104 from one another.

As shown in FIG. 2, the device 108(1) may capture speech from participants using the microphones 120. For example, the microphones 120 may capture the first speech 106(1) and the second speech 106(2). However, FIG. 2 illustrates that the first microphone 200(1) may be located proximate or nearest the first speech 106(1), while the second microphone 200(2) may be located proximate or nearest the second speech 106(2). As discussed above, these microphones may be respectively associated with the first participant 104(1) and the second participant 104(2) for use in generating the transcript 146. That is, in some instances, after attenuating noise from other background noise or other participants (e.g., same voice detection), an audio signal generated by the first microphone 200(1) may be used to formulate a transcript of the first participant 104(1), while an audio signal generated by the second microphone 200(2) may be used to formulate a transcript of the second participant 104(2). In such instances, as the first microphone 200(1) may capture audio of the first participant 104(1) at the highest energy, or highest signal level, after processing, this audio data may be used to determine the speech of the first participant 104(1). Similarly, as the second microphone 200(2) may capture audio of the second participant 104(2) at the highest energy, or highest signal level, after processing, this audio data may be used to determine the speech of the second participant 104(2).

To further illustrate, the first microphone 200(1) may capture first audio representative of the first speech 106(1). Using the audio data (or signals) generated by the other microphones 120 (e.g., the second microphone 200(2), the third microphone 200(3), and/or the fourth microphone 200(4)), the device 108(1) may isolate the speech of the first participant 104(1). In one approach, the device 108(1) (or another communicatively coupled device, system, or service) may include a beamforming component to analyze signals received from the microphones 200(1)-(4) (i.e., the microphones 120). As the speech is received from a particular direction, the directional signal (e.g., formed beam) associated with that direction tends to exhibit more energy or signal strength than the other signals (or beams), thereby arriving at the direction of the participants speaking.

Additionally, or alternatively, other techniques may be employed to determine a location or direction of the participants, or the number of distinct participants within the environment 102. For instance, a timing component may be configured to analyze signals from the microphones 200(1)-(4) to produce multiple time values indicative of timing differences between arrivals of the speech at the microphones 200(1)-(4). The time difference of arrival values may be analyzed to ascertain direction of the participants 104 and approximate location of the user within the environment 102. Triangulation, and the comparison of energy levels between microphones, may determine the presence of more than one participant and the location of the participant(s) relative to the device 108(1).

Isolating the first speech 106(1) of the first participant 104(1) may create a processed audio signal used to generate the transcript 146. As part of this process, the first audio corresponding to the first speech 106(1) may be associated with the first participant 104(1) and/or the first microphone 200(1) may be associated with the first participant 104(1). Therein, subsequent audio data generated by the first microphone 200(1) may associated with the first participant 104 (1), and background noise, echo, or speech of other participants (e.g., the second participant 104(2)) may be attenuated. Such processes may utilize same voice or speech detection across the audio data generated by the microphones 200(1)-(4) to attenuate and/or filter out audio other than the first participant 104(1) (e.g., the first speech 106 (1)). Therein, ASR and/or NLU may be performed on the audio signals to determine utterances of the first participant 104(1).

This process may repeat for second audio received by the second microphone 200(2), that represents the second speech 106(2)) of the second participant 104(2). More generally, the audio captured by the microphones 120 may be processed for determining or disambiguating the speech of any and all participants engaged in the meeting. After isolating the speech of participants, and performing ASR and/or NLU the transcript 146 may be generated.

The transcript 146 may indicate utterances made by the first participant 104(1) and the second participant 104(2), as well as utterances captured by devices in remote locations that indicate speech of additional participants. That is, the transcription service 110 may receive audio signals from a plurality of devices within the environment 102, or at remote locations, for generating the transcript 146. In this sense, the device 108(1) may represent just one device that receives audio for use in generating the transcript 146, or that obtains a recording of the meeting. For example, microphones located elsewhere in the environment 102 may be used to capture audio and/or personal devices carried by respective participants (e.g., held in their hands or pockets) may be used to capture audio.

Although the device 108(1) is illustrated and discussed as having certain components, the device 108(1) may be an input/output device configured to record audio and/or video, receive voice queries, commands, and/or utterances and provide data to one or more of the services and/or other applications. For example, one or more cameras may capture video data within an environment 102 for use in determining the presence of the participants 104. The device 108(1) may also include one or presentation devices (e.g., a video screen, speakers, etc.) that may be utilized to present sound and/or video to the participants 104.

FIGS. 3-8 illustrate various processes related to determining participants within a meeting and generating transcripts of the meeting. The processes described herein are illustrated as collections of blocks in logical flow diagrams, which represent a sequence of operations, some or all of which may be implemented in hardware, software, or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures, and systems described in the examples herein, such as, for example those described with respect to FIGS. 1 and 2, although the processes may be implemented in a wide variety of other environments, architectures, and systems.

Figure 3:
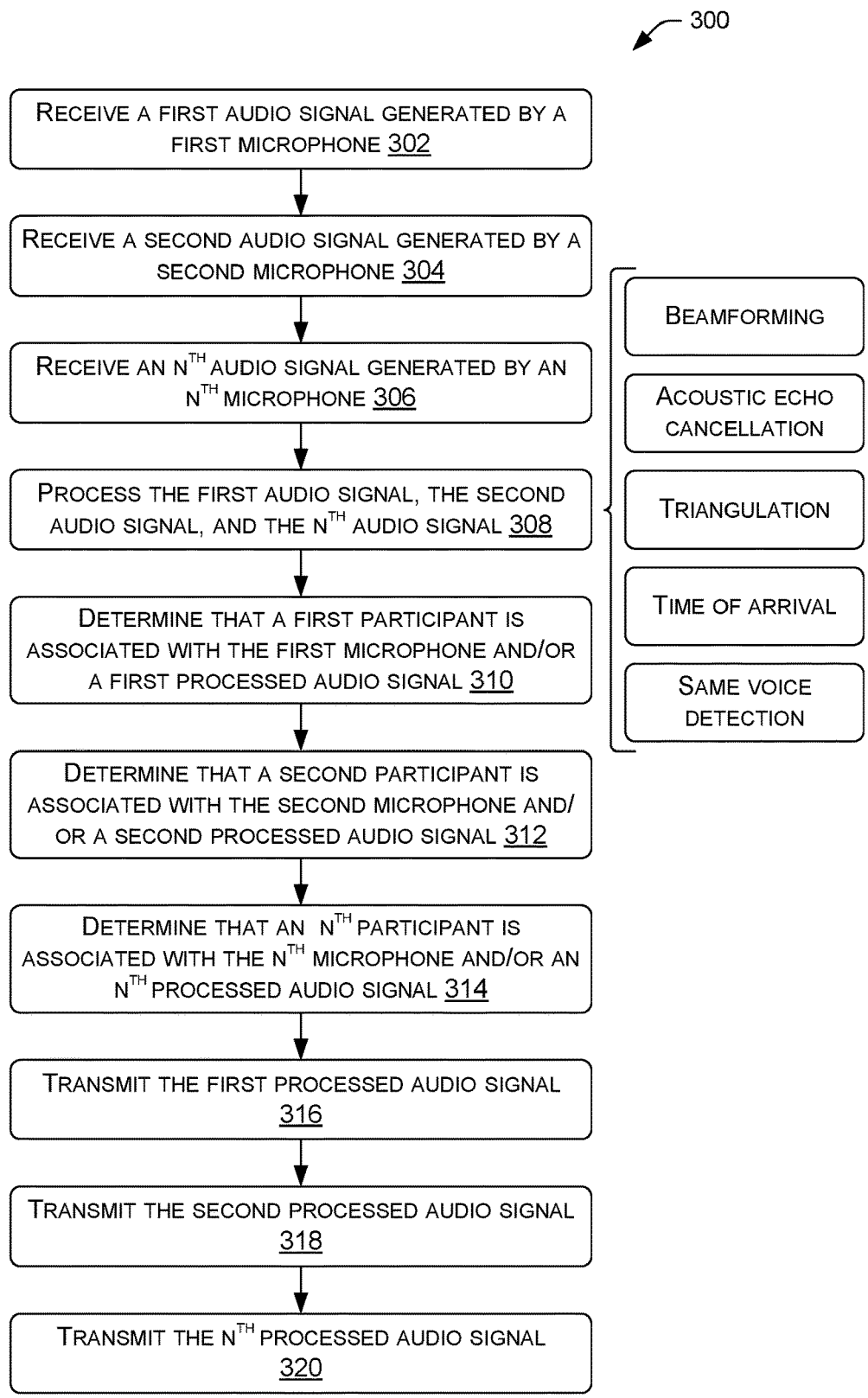
FIG. 3 illustrates an example process for obtaining audio data and processing audio signals for determining participants within an environment and/or engaged in a meeting, according to an embodiment of the present disclosure.

FIG. 3 illustrates an example process 300 for receiving audio, processing the audio, and transmitting the audio to generate transcripts.

At 302, the process 300 may receive a first audio signal generated by a first microphone. For example, the device 108(1) may receive a first audio signal generated by the first microphone 200(1).

At 304, the process 300 may receive a second audio signal generated by a second microphone. For example, the device 108(1) may receive a second audio signal generated by the second microphone 200(2).

At 306, the process 300 may receive an $n^{th}$ audio signal generated by an $n^{th}$ microphone. For example, the device 108(1) may receive the $n^{th}$ audio signal generated by an $n^{th}$ microphone of the device 108(1) (e.g., the third microphone 200(3), the fourth microphone 200(4), etc.). The $n^{th}$ microphone may also be separate from the device 108(1) (e.g., part of a separate device, standalone microphone, etc.))

At 308, the process 300 may process the first audio signal, the second audio signal, and/or the $n^{th}$ audio signal. For example, after receiving the first audio signal 126(1), the second audio signal 126(2), and/or the $n^{th}$ audio signal, the process 300 may perform various techniques associated with processing the audio and determining participants associated with the audio, and/or determining which audio corresponds to participants within the meeting. By way of example, the processing techniques may include beamforming, acoustic echo cancellation, triangulation, same voice detection, and/or time of arrival. As discussed above, these processing techniques function to determine the participants 104 within the environment 102, and/or which participants are substantially or primarily associated with the audio signal and/or the microphones 120, for use in generating the transcript 146.

At 310, the process 300 may determine that a first participant is associated with the first microphone and/or first processed audio signal. For example, as part of processing the audio received from the microphones 120, the process 300 may determine that speech of the first participant 104(1) (e.g., the first speech 106(1)) is associated with the first microphone 200(1) (e.g., based on an energy level, beamforming, etc.). Such determination, after processing the audio to attenuate noise or speech of other participants, may be utilized to identify the speech of the first participant 104(1). For example, the techniques may process the audio to substantially cancel acoustic echoes and substantially reduce double talk. Noise reduction may also be provided to process the audio signals to substantially reduce noise originating from sources other than an associated participant. In this manner, audio signals may be processed to identify times where echoes are present, where double talk is likely, where background noise is present, and attempt to reduce these external factors to isolate and focus on the speech of the near participant. By isolating on signals indicative of the speech from the near participant, better signal quality is provided to enable more accurate interpretation of the speech. Therein, after attenuating the noise of other sources within the environment 102, other than the first participant 104(1), the first processed audio signal may correspond to the speech of the first participant 104(1).

At 312, the process 300 may determine that a second participant is associated with the second microphone and/or second processed audio signal. For example, as part of processing the audio received from the microphones 120, the process 300 may determine that speech of the second participant 104(2) (e.g., the second speech 106(2)) is associated with the second microphone 200(2) (e.g., based on an energy level, beamforming, etc.). Such determination, after processing the audio to attenuate noise or speech of other participants, may be utilized to identify the speech of the second participant 104(2). Therein, after attenuating the noise of other sources within the environment 102, other than the second participant 104(2), the second processed audio signal may correspond to the speech of the second participant 104(2).

At 314, the process 300 may determine that an $n^{th}$ participant is associated with the $n^{th}$ microphone and/or an $n^{th}$ processed audio signal. For example, as part of processing the audio received from the microphones 120, the process 300 may determine that speech of an $n^{th}$ participant is associated with the $n^{th}$ microphone. In some instances, the $n^{th}$ microphone may be a physical microphone of the device 108(1), or may represent a virtual microphone that corresponds to audio data generated across multiple microphones. Therein, after attenuating the noise of other sources within the environment 102, other than the $n^{th}$ participant, the $n^{th}$ processed audio signal may correspond to the speech of the second participant 104(2).

At 316, the process 300 may transmit the first processed audio data, or a first processed audio signal. For example, after determining that the first processed audio signal or that the first microphone 200(1) corresponds to the first participant 104(1), the device 108(1) may transmit the first processed audio signal (e.g., the audio signal 126(1)) to the transcription service 110.

At 318, the process 300 may transmit the second processed audio data, or a second audio signal. For example, after determining that the second processed audio signal or that the second microphone 200(2) corresponds to the second participant 104(2), the device 108(1) may transmit the second processed audio signal (e.g., the audio signal 126(2)) to the transcription service 110.

At 320, the process 300 may transmit the $n^{th}$ processed audio data, or an $n^{th}$ audio signal. For example, after determining that the $n^{th}$ processed audio signal or that the $n^{th}$ microphone corresponds to the $n^{th}$ participant, the device 108(1) may transmit the $n^{th}$ processed audio signal to the transcription service 110.

In some instances, the device 108(1) may perform the processing of the transcription service 110 on the audio to determine, identify, and associate the audio (or signals) and/or microphones with participants.

Figure 4:
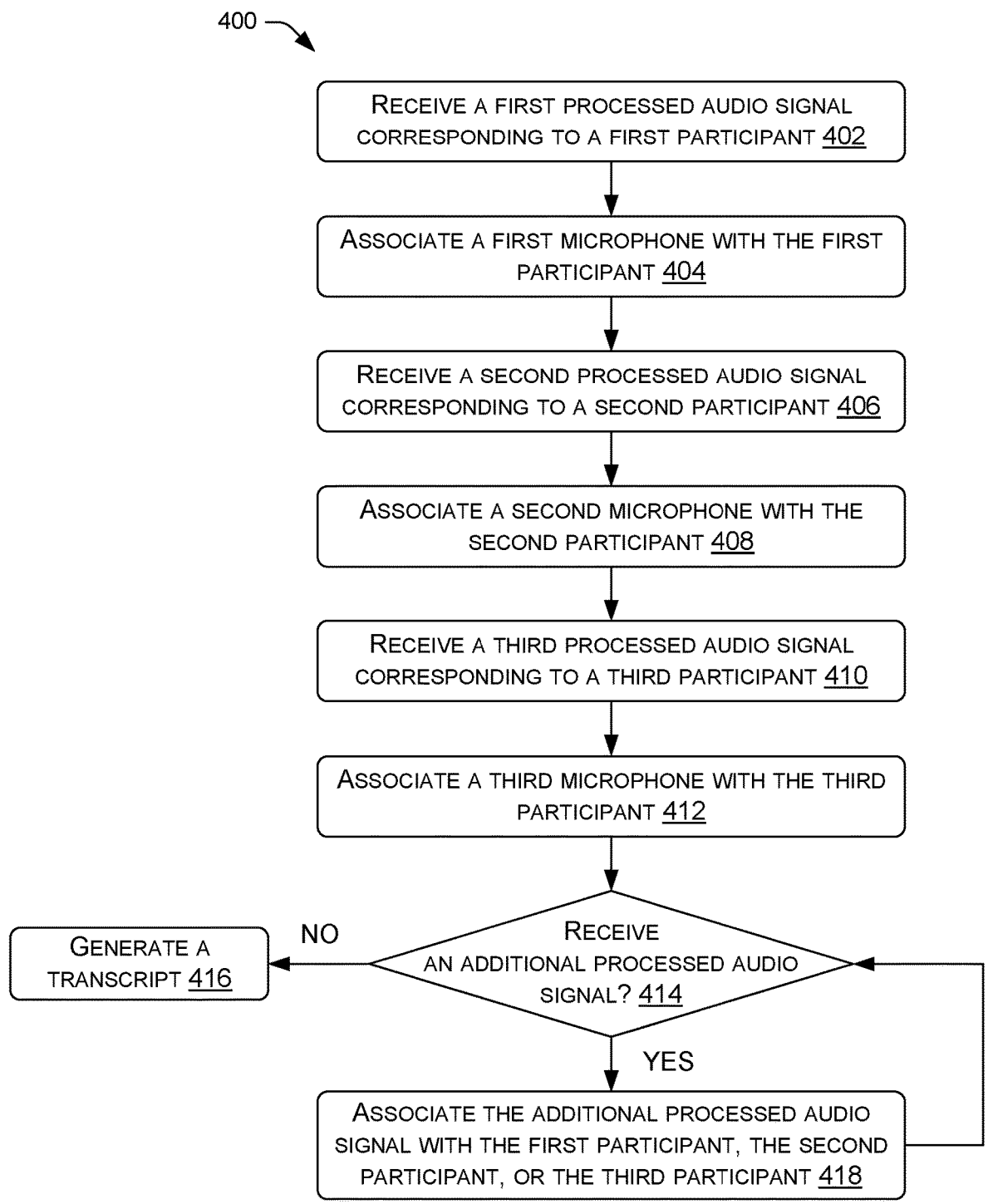
FIG. 4 illustrates an example process for generating a transcript of a meeting using captured audio data, and associating the audio data with participants within the meeting, according to an embodiment of the present disclosure.

FIG. 4 illustrates an example process 400 for generating transcripts of a meeting.

At 402, the process 400 may receive a first processed audio signal (or data) corresponding to a first participant. For example, the transcription service 110 may receive the audio signal 126(1) corresponding to speech of the first participant 104(1), as captured by the device 108(1). In some instances, the audio signal 126(1) received by the transcription service 110 may be already processed for removing noise or audio from sources other than the first participant 104(1).

At 404, the process 400 may associate a first microphone with the first participant. For example, the transcription service 110 may store the mapping information 156 that indicates the first microphone 200(1) of the device 108(1) is associated with the first participant 104(1). Such association may indicate that the first microphone 200(1) is nearest the first participant 104(1) or substantially captures speech of the first participant 104(1). Such association may be utilized when generating the transcript 146 of the meeting for identifying or determining the first speech 106(1) of the first participant 104(1).

At 406, the process 400 may receive a second processed audio signal (or data) corresponding to a second participant. For example, the transcription service 110 may receive the audio signal 126(2) corresponding to speech of the second participant 104(2), as captured by the device 108(1). In some instances, the audio signal 126(2) received by the transcription service 110 may be already processed for removing noise or audio from sources other than the second participant 104(2).

At 408, the process 400 may associate a second microphone with the second participant. For example, the transcription service 110 may store the mapping information 156 that indicates the second microphone 200(2) of the device 108(1) is associated with the second participant 104(2). Such association may indicate that the second microphone 200(2) is nearest the second participant 104(2) or substantially captures speech of the second participant 104(2). Such association may be utilized when generating the transcript 146 of the meeting for identifying or determining the second speech 106(2) of the second participant 104(2).

At 410, the process 400 may receive a third processed audio signal (or data) corresponding to a third participant. For example, the transcription service 110 may receive the audio signal 126(3) corresponding to the third speech 106(3) of the third participant 112, as captured by the device 108(2).

At 412, the process 400 may associate a third microphone with the third participant. For example, the transcription service 110 may store the mapping information 156 that indicates a third microphone of the device 108(2), or a microphone of the device 108(2), is associated with the third participant 112. Such association may indicate that the audio signal 126(3) received from the device 108(2) corresponds to the third speech 106(3) or utterances of the third participant 112.

At 414, the process 400 may determine whether additional processed audio signal (or data) are received. For example, the transcription service 110 may determine whether additional audio signals (or data) are received from the devices 108 engaged in the meeting or whether the meeting has concluded. In some instances, the transcription service 110 may continuously receive audio signals/data from the devices 108 throughout the meeting, or may receive the audio signal/data at the conclusion of the meeting for generating the transcript 146. If the process 400 determines that no additional processed audio signals/data are received, the process 400 may follow the "NO" route and proceed to 416.

At 416, the process 400 may generate a transcript of the meeting, which may represent the speech or utterances of the first participant, the second participant, and/or the third participant. For example, the transcription service 110 may perform ASR and/or NLU or the audio data (e.g., the audio signal 126(1)-(3)) to generate the transcript 146. In some instances, the transcription service 110 may utilize components, such as the transcription component 138, for processing the audio signal 126(1)-(3) and generating corresponding text associated with the speech 106(1)-(3). Such text may be used to generate the transcript 146 of the meeting, and the utterances of the respective participants.

Alternatively, if the process 400 at 414 determines that additional processed audio signals (or data) is received, or that the meeting has not concluded, the process 400 may follow the "YES" route and proceed to 418. At 418, the process 400 may associate the additional processed audio signals (or data) with the first participant, the second participant, or the third participant. For example, after receiving the additional processed audio signals (or data), the transcription service 110 may determine the originating source of the audio signals, or which microphone generated and/or received the audio associated with the additional processed audio signals. Such determination may indicate whether the additional audio signals, or data therein, are associated with the first participant 104(1), the second participant 104(2), or the third participant 112. That is, the association of participants to respective microphones (e.g., using the mapping information 156), may be used to determine which participant the additional audio signal(s) correspond to, or who is associated with, the additional audio signal(s).

From 418, the process 400 may loop to 414 and generating the transcript 146 if additional audio signal(s) are not received. As such, the process 400 illustrates a scenario whereby the transcription service 110 generates the transcript 146 of the meeting. After generating the transcript 146, the transcription service 110 may store the transcript 146 and/or transmit the transcript 146 to participants of the meeting.

Figure 5:
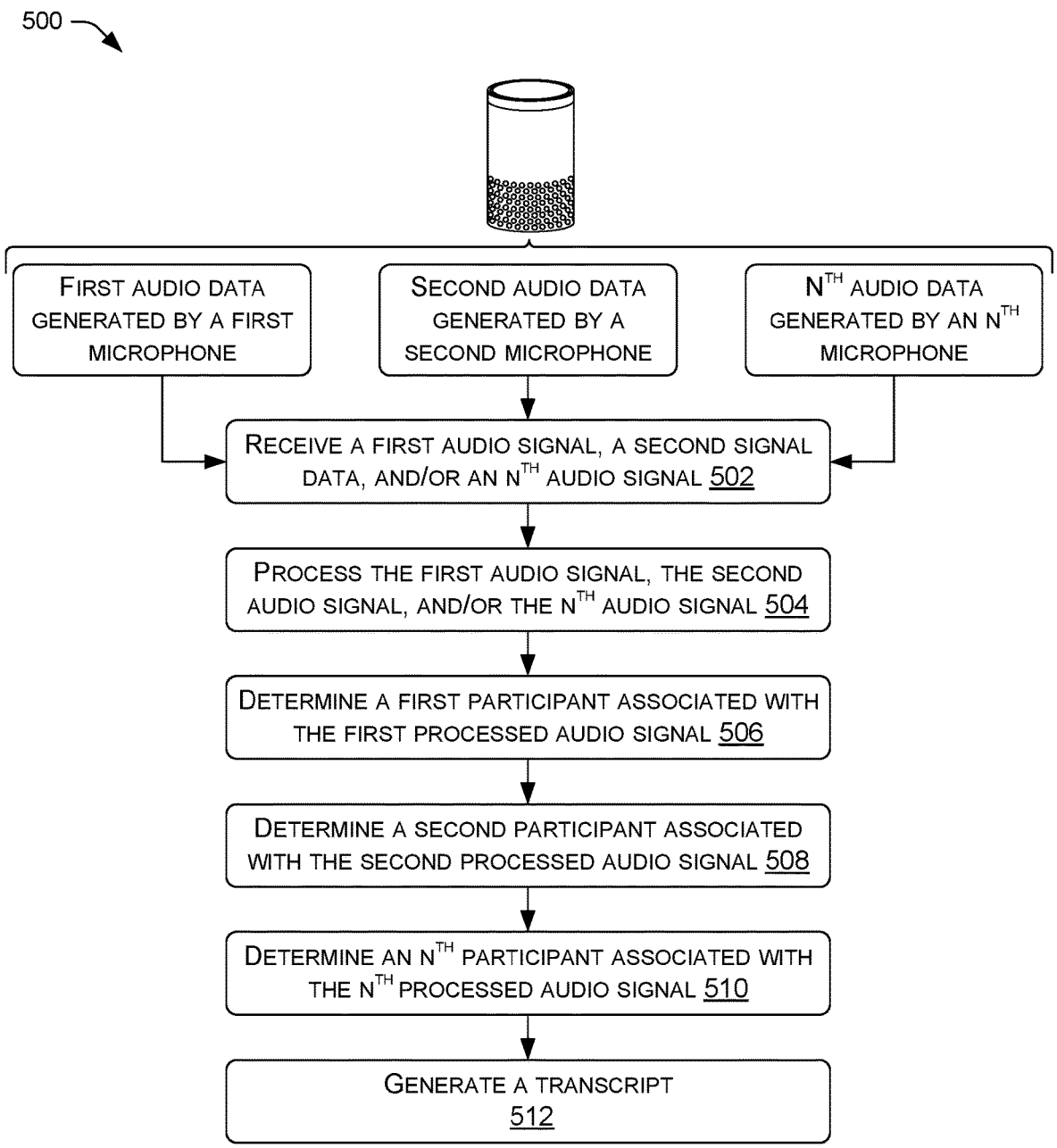
FIG. 5 illustrates an example process for generating a transcript of a meeting using captured audio data, according to an embodiment of the present disclosure.

FIG. 5 illustrates an example process 500 for receiving audio of a meeting, processing the audio data, and generating transcripts.

At 502, the process 500 may receive a first audio signal representative of first audio data generated by a first microphone, a second audio signal representative of second audio data generated by a second microphone, and/or an $n^{th}$ audio signal representative of $n^{th}$ audio data. For example, the transcription service 110 may receive, from the device 108(1), the first audio signal 126(1) and/or the second audio signal 126(2). The transcription service 110, however, may receive additional $n^{th}$ audio data generated by the device 108(1), the device 108(2), or other microphones within one or more environments in which the meeting takes place. In some instances, the transcription service 110 may receive any number of audio signals generated by microphones, and which are utilized for capturing utterances or speech of participants engaged in the meeting.

At 504, the process 500 may process the first audio signal (or data therein), the second audio signal (or data therein), and/or the $n^{th}$ audio signal (or data therein). For example, the transcription service 110 may process the audio data to determine a number of distinct participants engaged in the meeting, a number of distinct participants within the environment 102 (e.g., the first participant 104(1) and the second participant 104(2)) to disambiguate the participants. Discussed above, such processing may include beamforming, time of arrival, noise cancellation, same voice detection, a comparison of energy/signal levels, for disseminating speech of the participants.

At 506, the process 500 may determine a first participant associated with the first processed audio signal. For example, as part of processing the audio signal 126, the transcription service 110 may determine to associate the first processed audio signal with the first participant 104(1). In other words, the first processed audio signal (or data therein) may represent the speech of the first participant 104(1), or a microphone that generated the audio signal 126(1) is associated with the first participant 104(1).

At 508, the process 500 may determine a second participant associated with the second processed audio signal. For example, as part of processing the audio signal 126, the transcription service 110 may determine to associate the second processed audio signal with the second participant 104(2). In other words, the second processed audio signal (or data therein) may represent the speech of the second participant 104(2), or a microphone that generated the audio signal 126(2) is associated with the second participant 104(2).

At 510, the process 500 may determine an $n^{th}$ participant associated with an $n^{th}$ processed audio signal. For example, as part of processing the audio signals, the transcription service 110 may determine to associate the $n^{th}$ processed audio signal with the $n^{th}$ participant. The $n^{th}$ processed audio signal (or data therein) may represent the speech of the $n^{th}$ participant, or a microphone that generated the $n^{th}$ audio signal is associated with the $n^{th}$ participant. The $n^{th}$ audio signal may also be generated as a combination of audio signals from multiple microphones (e.g., virtual microphones).

At 510, the process 500 may generate a transcript of the meeting. For example, the transcription component 138 of the transcription service 110 may generate the transcript 146. The transcript 146 may also be generated utilizing ASR and/or NLU techniques. In some instances, as part of generating the transcript, action item(s) may be identified. For example, the transcript 146 may be parsed for key words and/or key phrases to identify action items discussed during the meeting. In some instances, tasks may be generated that correspond to the action items.

Figure 6:
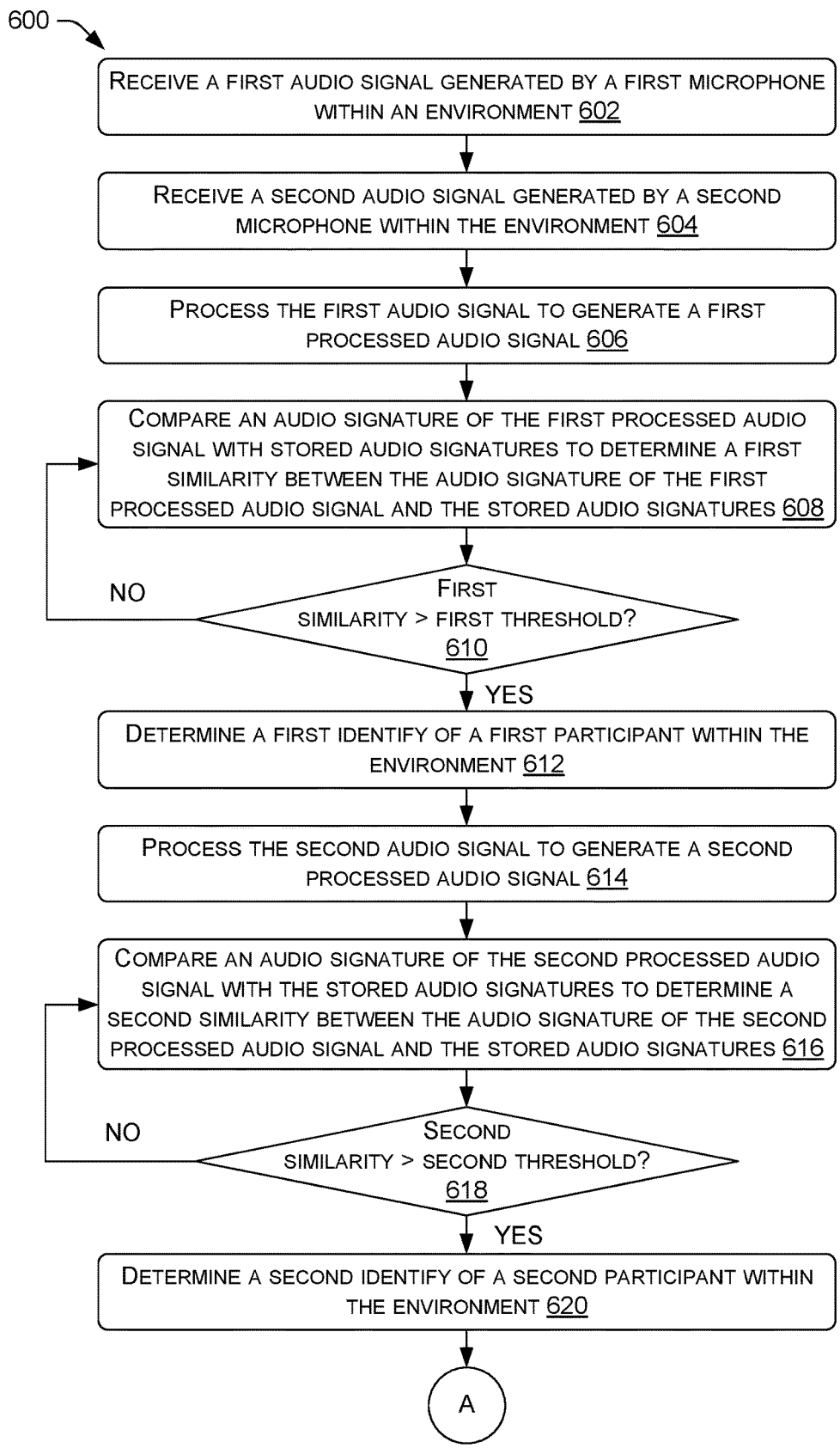
FIG. 6 illustrates an example process for generating a transcript of a meeting using captured audio data, and determining an identity of participants in the meeting, according to an embodiment of the present disclosure.
Figure 7:
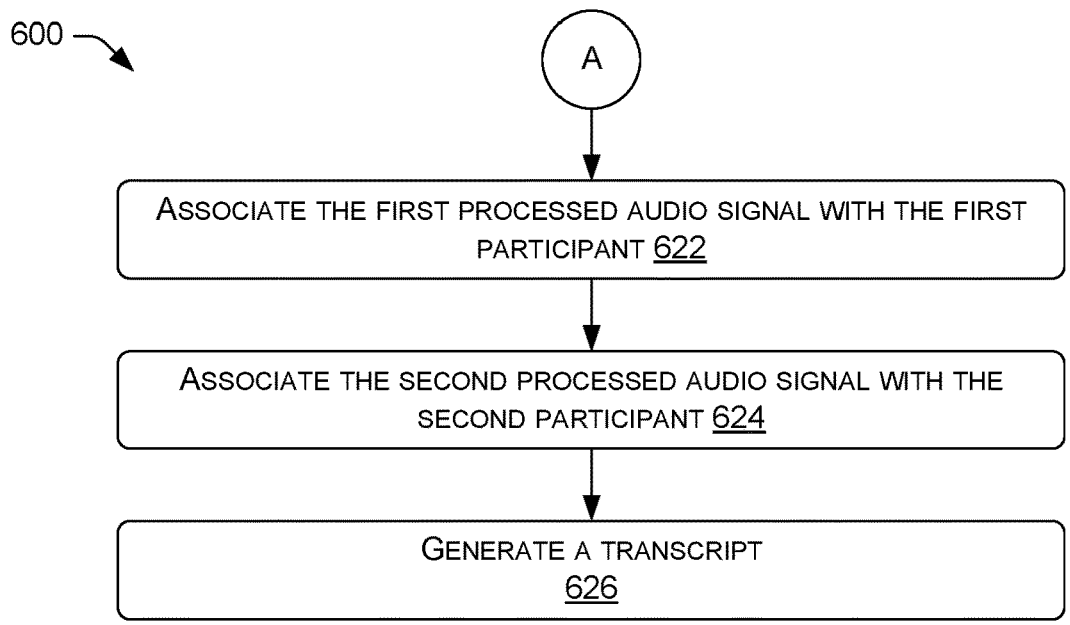
FIG. 7 illustrates additional operations of the example process of FIG. 6, according to an embodiment of the present disclosure.

FIGS. 6 and 7 illustrates an example process for determining an identify of participants engaged in a meeting.

At 602 the process 600 may receive a first audio signal generated by a first microphone within an environment. For example, the transcription service 110 may receive, from the device 108(1), the audio signal 126(1) generated by the first microphone 200(1).

At 604 the process 600 may receive a second audio signal generated by a second microphone within the environment. For example, the transcription service 110 may receive, from the device 108(1), the audio signal 126(2) generated by the second microphone 200(2).

At 606, the process 600 may process the first audio signal to generate a first processed audio signal (or data). For example, components of the transcription service 110 may attenuate noise of other participants within the environment 102 such that the first processed audio signal substantially represents utterances or speech of the first participant 104(1).

At 608, the process 600 may compare a signature of the first processed audio signal to previously stored signatures are associated with participants to determine a first similarity between the signature of the first processed audio signal and the previously stored audio signatures. For example, the audio signatures stored in association with the participant profiles 150 may be compared to an audio signature of the first processed audio signal. This may include comparing a volume, pitch, frequency, tone, and/or other audio characteristic(s) of the first processed audio signal to the stored signatures. In some instances, the speaker identification component 136 may determine the first similarity.

At 610, the process 600 may determine whether the first similarity is greater than a first threshold. If not, meaning that the signature of the generated first processed audio signal does not match well with the selected signature to which it was compared, then the process 600 may follow the "NO" route and loop back to 608 to compare the signature of the first processed audio signal to another previously generated signature associated with a different participant. If, however, the calculated similarity is greater than the first threshold, meaning that the signature of the generated signal and the selected signature are strong matches, then the process 600 may follow the "YES" route and proceed to 612.

At 612, the process may determine a first identity of a first participant within the environment. For example, based on determining a match (e.g., above the first threshold) between the audio signature of the first processed audio signal and the previously stored audio signature, the process 600 may determine an identity of a participant (e.g., the first participant 104(1)) associated with that previously stored audio signature.

At 614, the process 600 may process the second audio signal to generate a second processed audio signal. For example, components of the transcription service 110 may attenuate noise of other participants within the environment 102 such that the second processed audio signal substantially represents utterances of the second participant 104(2).

At 616, the process 600 may compare a signature of the second processed audio signal to the previously stored signatures associated with participants to determine a second similarity between the signature of the second processed audio signal and the previously stored audio signatures. For example, audio signatures stored in association with the participant profiles 150 may be compared to an audio signature of the second processed audio signal. As discussed above, this may include comparing a volume, pitch, frequency, tone, and/or other audio characteristic(s) of the first processed audio signal to the stored signatures. In some instances, the speaker identification component 136 may determine the second similarity.

At 618, the process 600 determines whether the second similarity is greater than a second threshold. If not, meaning that the signature of the second processed audio signal does not match well with the selected signature to which it was compared, then the process 600 may follow the "NO" route and loop back to 616 to compare the signature of the generated second processed audio signal to another previously generated signature associated with a different participant. If, however, the calculated similarity is greater than the second threshold, meaning that the signature of the generated signal and the selected signature are strong matches, then the process 600 may follow the "YES" route and proceed to 620.

At 620, the process may determine a second identity of a second participant within the environment. For example, based on determining a match (e.g., above the second threshold) between the audio signature of the second processed audio signal and the previously stored audio signature, the process 600 may determine an identity of a participant (e.g., the second participant 104(2)) associated with that previously stored audio signature.

From 620, the process 600 may proceed to "A" of FIG. 6 whereby at 622, shown in FIG. 7, the process 600 may associate the first processed audio signal (or data) with the first participant. For example, based on the first similarity being greater than the first threshold, the process 600 may determine that the first processed audio signal is associated with the first participant 104(1), or speech of the first participant 104(1).

At 624, the process 600 may associate the second processed audio signal (or data) with the second participant. For example, based on the second similarity being greater than the second threshold, the process 600 may determine that the second processed audio signal is associated with the second participant 104(2), or speech of the second participant 104(2).

At 626, the process 626 may generate a transcript of the meeting, representing the respective utterances of the first participant and the second participant (or other participants within the environment 102 and/or engaged in the meeting). For example, the transcription component 138 of the transcription service 110 may generate the transcript 146. The transcript 146 may be generated utilizing ASR and/or NLU techniques.

In some instances, generally, the speaker identification component 136 may analyze a candidate set of reference audio signatures against the audio signature from the first and/or second processed audio signals to determine a confidence value associated with how closely the sample audio signature corresponds to each or some of the reference audio signatures. The reference audio signature with the most favorable confidence value may be selected and may indicate which user profile the audio data is associated with. In some instances, the process 600 may narrow a set of candidate reference audio signatures based on information about who was invited or who is attending the meeting (e.g., based on the participants accepting the meeting invite). From there, the transcription service 110 may determine participants within the meeting and may then compare the audio signatures of those participants to determine which participant said what during the meeting. Furthermore, in some instances, other forms of data may be used for identifying the participants, such as facial recognition obtained from cameras within the environment 102.

Figure 8:
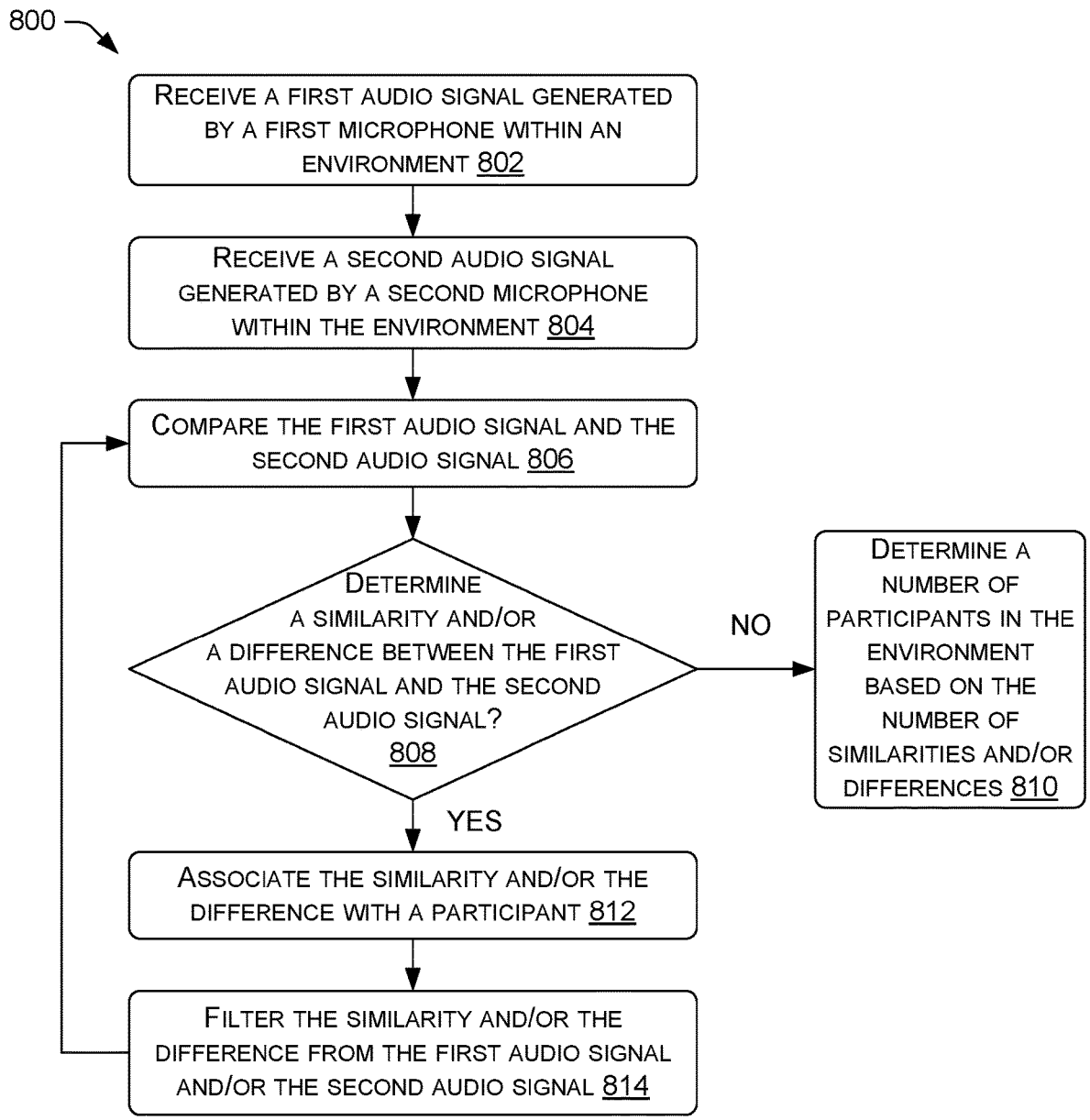
FIG. 8 illustrates an example process for determining the presence of distinct participants within an environment, or disambiguating between participants within an environment, according to an embodiment of the present disclosure.

FIG. 8 illustrates an example process 800 for performing iterative operations to determine the number of participants within an environment, or for disambiguating participants from one another within an environment.

At 802, the process 800 may receive a first audio signal generated by a first microphone within an environment. For example, the transcription service 110 may receive a first audio signal generated by a first microphone of the device 108(1) within the environment 102.

At 804, the process 800 may receive a second audio signal generated by a second microphone within the environment. For example, the transcription service 110 may receive a second audio signal generated by a second microphone of the device 108(1), or of another device, in the environment 102.

At 806, the process 800 may compare the first audio signal and/or the second audio signal. For example, audio processing components of the transcription service 110 may compare the first audio signal and the second audio signal to identify similarities and/or differences therebetween. In some instances, comparing the first audio signal and the second audio signal may include comparing frequencies, amplitudes, pitch, and/or other audio characteristics to identify the similarities and/or differences.

At 808, the process 800 may determine whether there is a similarity and/or a difference between the first audio signal and the second audio signal. For example, the transcription service 110, based on comparing the first audio signal and the second audio signal, may determine a portion of the first audio signal that corresponds to a portion of the second audio signal, vice versa, that represents the same speech or sound. For example, the first microphone and the second microphone may receive the same audio but at different energy levels. The comparison of the first audio signal and the second audio signal may therefore identify the portion of the speech that were received at the microphones, respectively. If at 808 the process 800 determines that there is not a similarity between the first audio signal and the second audio signal, then the process 800 may follow the "NO" route and proceed to 810 whereby the process 800 may determine a number of participants within the environment 102 based on the number of similarities and/or differences.

Alternatively, if at 808 the process 800 determines that there are similarities and/or differences, the process 800 may follow the "YES" route and proceed to 812, whereby the process 800 may associate the similarity and/or difference with a participant. For example, the transcription service 110 may associate the same audio, or the portion of the same audio represented within the first audio signal and the second audio signal, with a participant. This portion, noted above, may represent the same speech of the participant as captured by the respective microphones in the environment 102.

At 814, the process 800 may filter the similarity and/or the difference from the first audio signal and/or the second audio signal. For example, based on determining the portion of the first audio signal and the portion of the second audio signal that correspond to speech of a participant, that speech (or audio) may be filtered from the audio signals. Filtering this speech from the audio signals, respectively, may be used to identify additional participants within the environment 102. That is, as shown, from 814, the process 800 may loop to 806 whereby the process may compare the first audio signal and the second audio signal. However, at this instance, the first audio signal and the second audio signal may be compared after filtering out the speech of the participant within the environment. Therein, the comparison of the filtered first audio signal and the filtered second audio signal may be used to identify additional participants within the environment 102.

At the conclusion, after there are no additional similarities and/or differences, a number of participants may be determined. Additionally, each of these similarities and/or differences, or the portions of the audio signals that are filtered out, may be used for generating a transcription of the meeting and/or associating microphones with participants. Furthermore, participants may be associated with virtual microphones, or the combination of audio signals across microphones, to determine a speech signal used to generate corresponding audio and/or data for the participant.

Although the process 800 is discussed as being performed by the transcription service 110, some or all of the audio processing may be carried out by the device 108(1). Additionally, more than two audio signals may be received from the environment 102 for determining the presence of the participants and/or disambiguating between the participants.

Figure 9:
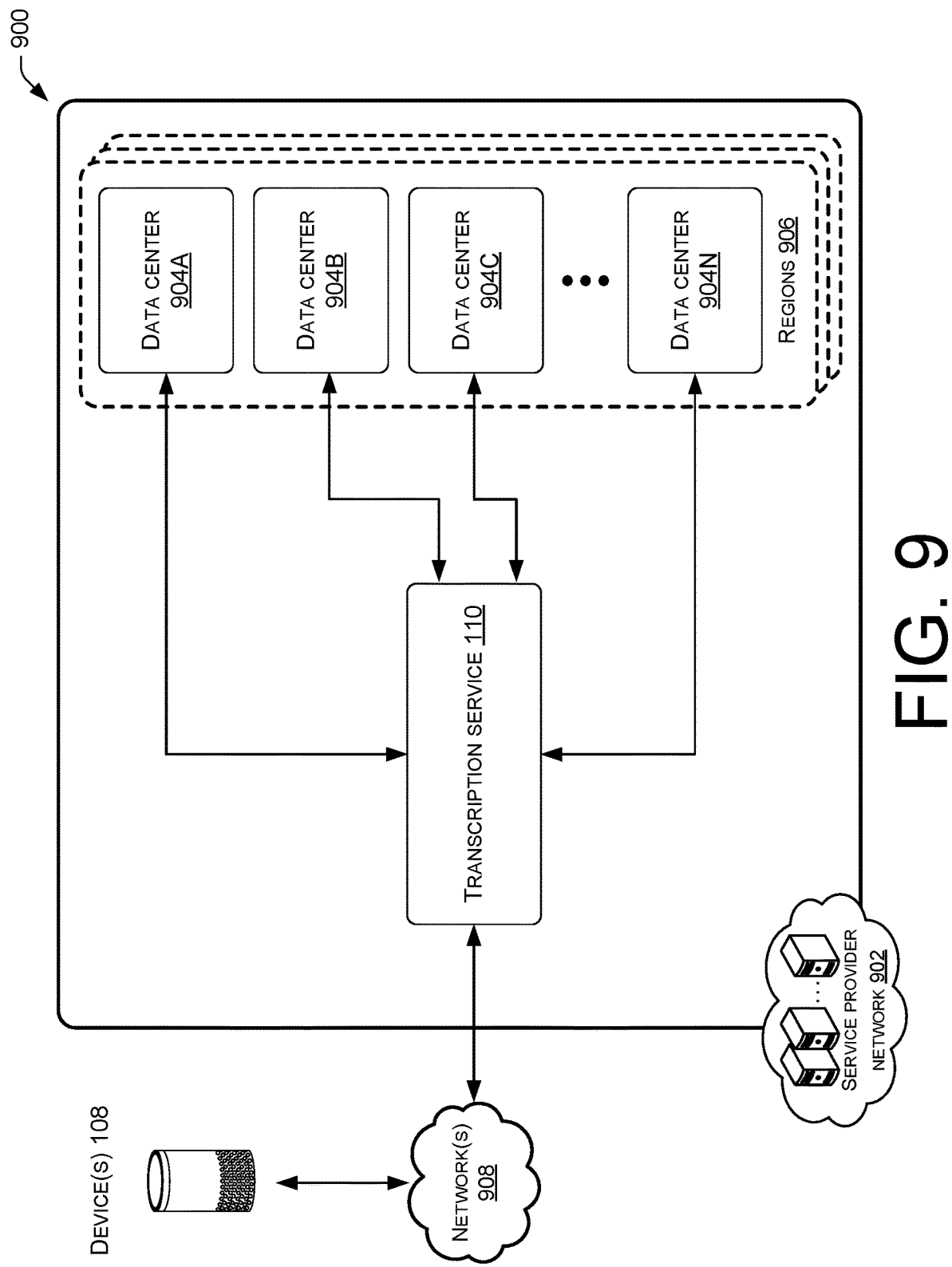
FIG. 9 illustrates an example system and network diagram that shows an operating environment including a service provider network that may be configured to implement aspects of the functionality described herein, according to an embodiment of the present disclosure.

FIG. 9 is a system and network diagram that shows an illustrative operating environment 900 that includes a service provider network 902. The service provider network 902 may be configured to implement aspects of the functionality described herein, such as the functions of the transcription service 110 to generate the transcripts 146. The service provider network 902 may provide computing resources, like virtual machine (VM) instances and storage, on a permanent or an as-needed basis. The computing resources provided by the network service provider 902 may include data processing resources, data storage resources, networking resources, data communication resources, network services, and the like. Among other types of functionality, the computing resources provided by the service provider network 902 may be utilized to implement the various services and components described above.

Each type of computing resource provided by the service provider network 902 may be general-purpose or may be available in a number of specific configurations. For example, data processing resources may be available as physical computers or VM instances in a number of different configurations. The VM instances may be configured to execute applications, including web servers, application servers, media servers, database servers, gaming applications, and/or other types of programs. Data storage resources may include file storage devices, block storage devices, and the like. The service provider network 902 may also be configured to provide other types of computing resources not mentioned specifically herein.

The computing resources provided by the service provider network 902 may be enabled in one embodiment by one or more data centers 904A-904N (which might be referred to herein singularly as "a data center 904" or in the plural as "the data centers 904"). The data centers 904 are facilities utilized to house and operate computer systems and associated components. The data centers 904 typically include redundant and backup power, communications, cooling, and security systems. The data centers 904 may also be located in geographically disparate locations, or regions 806. One illustrative embodiment for a data center 904 that may be utilized to implement the technologies disclosed herein will be described below with regard to FIG. 9.

The transcription service 110 may utilize the service provider network 902 and may access the computing resources provided by the service provider network 902 over any wired and/or wireless network(s) 908 (such as the network 114), which may be a wide area communication network ("WAN"), such as the Internet, an intranet or an Internet service provider ("ISP") network or a combination of such networks. For example, and without limitation, the devices 108 engaged in the meeting may transmit audio data (or other data, information, content, etc.) to the service provider network 902, or computing resources thereof, by way of the network(s) 908. It should be appreciated that a local-area network ("LAN"), the Internet, or any other networking topology known in the art that connects the data centers 904 to remote clients and other users may be utilized. It should also be appreciated that combinations of such networks may also be utilized. The transcription service 110 may be offered as a service by the service provider network 902 and may manage the deployment of computing resources of the service provider network 902 when generating the transcripts 146 within the transcript database 148, as described herein.

FIG. 9 is a computing system diagram 1000 that illustrates one configuration for the data center 904 that implements aspects of the technologies disclosed herein. The example data center 904 shown in FIG. 9 includes several server computers 1002A-1002F (which might be referred to herein singularly as "a server computer 1002" or in the plural as "the server computers 1002") for providing computing resources 1004A-1004E.

The server computers 1002 may be standard tower, rack-mount, or blade server computers configured appropriately for providing the computing resources described herein (illustrated in FIG. 9 as the computing resources 1004A-1004E). The computing resources provided by the service provider network 902 may be data processing resources such as VM instances or hardware computing systems, database clusters, computing clusters, storage clusters, data storage resources, database resources, networking resources, and others. Some of the server computers 1002 may also be configured to execute a resource manager 1006 capable of instantiating and/or managing the computing resources. In the case of VM instances, for example, the resource manager 1006 may be a hypervisor or another type of program configured to enable the execution of multiple VM instances on a single server computer 1002. The server computers 1002 in the data center 904 may also be configured to provide network services and other types of services.

In the example data center 904 shown in FIG. 9, an appropriate LAN 908 is also utilized to interconnect the server computers 1002A-1002F. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components may also be utilized for balancing a load between each of the data centers 904A-904N, between each of the server computers 1002A-1002F in each data center 904, and, potentially, between computing resources in each of the server computers 1002. It should be appreciated that the configuration of the data center 904 described with reference to FIG. 9 is merely illustrative and that other implementations may be utilized.

The data center 904 shown in FIG. 9 also includes a server computer 1002F that may execute some or all of the software components described above. For example, and without limitation, the server computer 1002F (and the other server computers 1002) may generally correspond to a server/computing device configured to execute components including, without limitation, the transcription service 110 that manages the generation of the transcripts 146, as described herein, and/or the other software components described above. The server computer 1002F may also be configured to execute other components and/or to store data for providing some or all of the functionality described herein. In this regard, it should be appreciated that the components illustrated in FIG. 9 as executing on the server computer 1002F may execute on many other physical or virtual servers in the data centers 904 in various embodiments. Thus, the data center 904 in FIG. 9 may also include a plurality of server computers 1002 that execute a fleet of VM instances.

Figure 10:
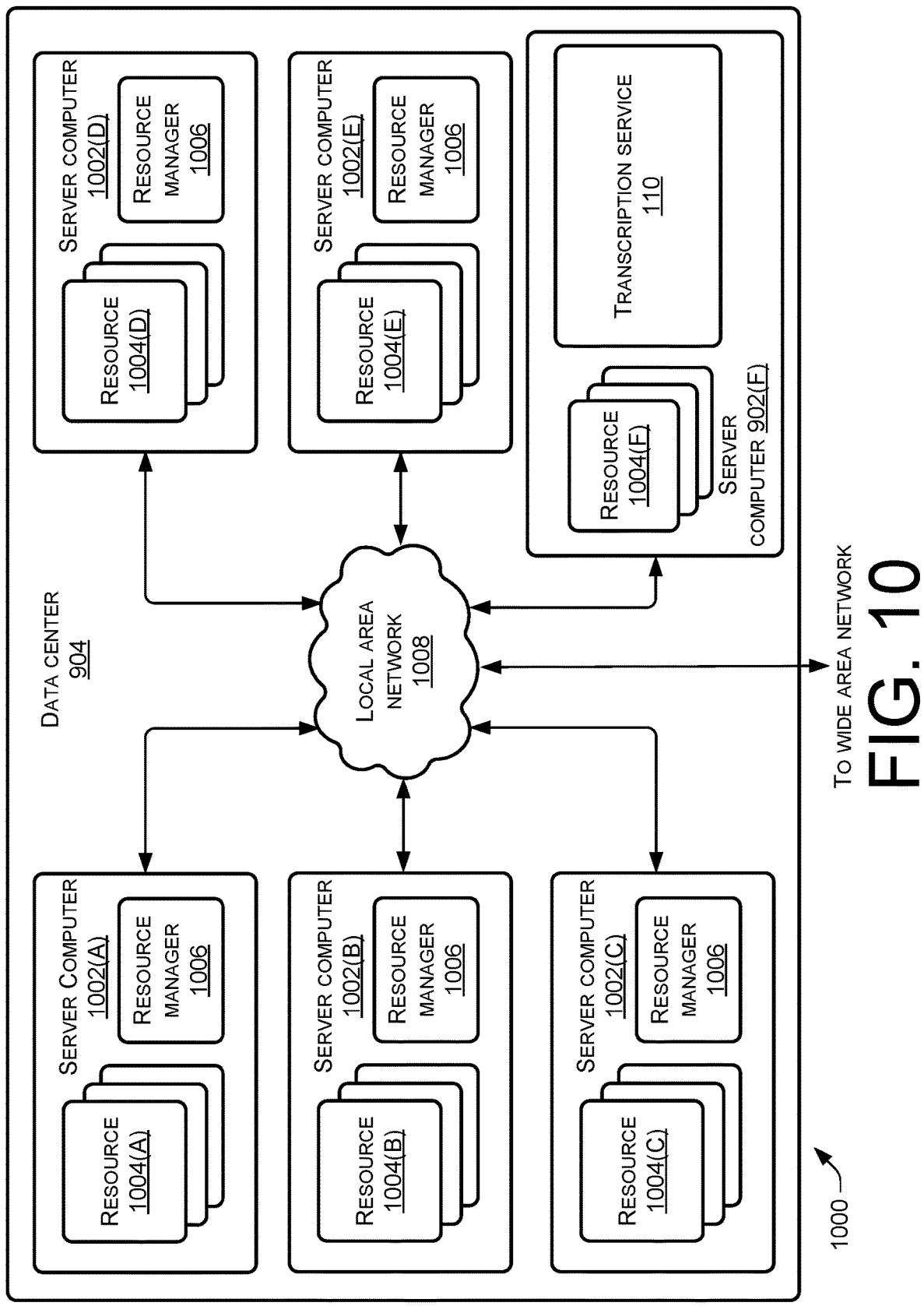
FIG. 10 illustrates an example computing system diagram showing a configuration for a data center that may be utilized to implement aspects of the technologies disclosed herein, according to an embodiment of the present disclosure.
Figure 11:
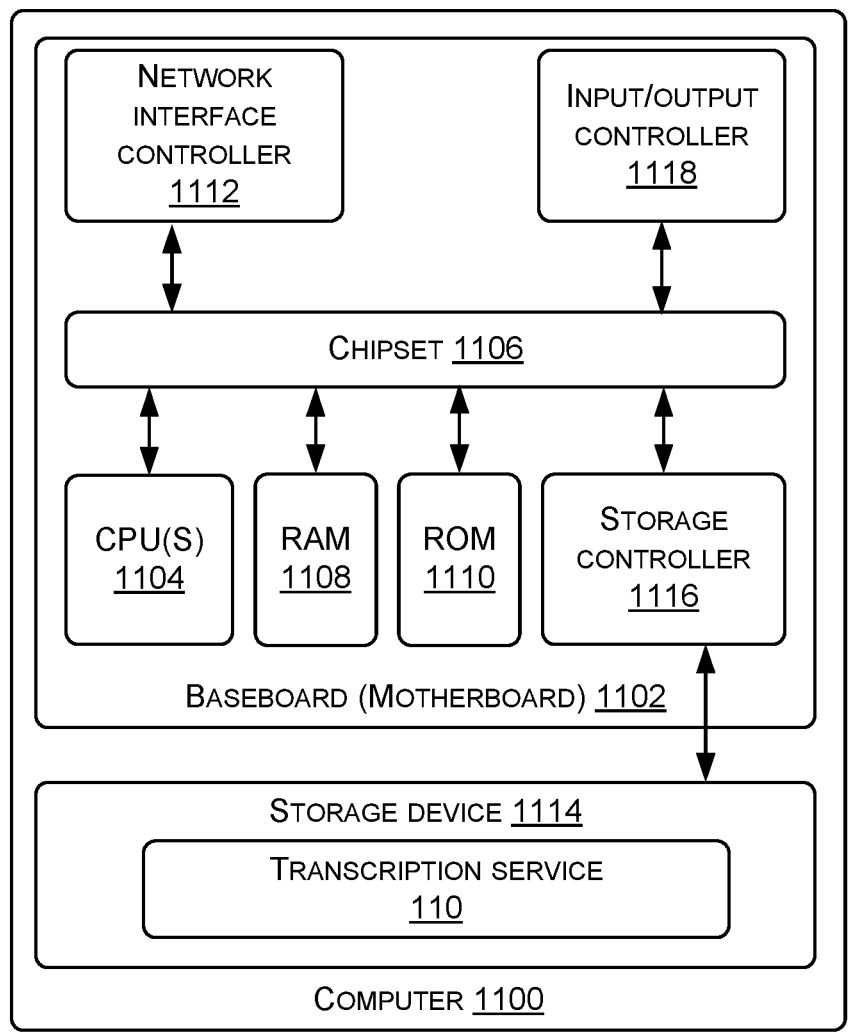
FIG. 11 illustrates an example computer architecture diagram showing an exemplary computer hardware architecture for implementing a computing device that may be utilized to implement aspects of the various technologies presented herein, according to an embodiment of the present disclosure.

FIG. 10 shows an example computer architecture for a computer 1100 capable of executing program components for implementing the functionality described above. The computer architecture shown in FIG. 10 illustrates a server computer, workstation, desktop computer, laptop, tablet, network appliance, e-reader, smartphone, or other computing device, and may be utilized to execute any of the software components presented herein. In some examples, the computer 1100 may correspond to one or more computing devices that implements the components and/or services described in FIG. 1 (e.g., the devices 108, the transcription service 110, etc.).

The computer 1100 includes a baseboard 1102, or "motherboard," which is a printed circuit board to which a multitude of components or devices may be connected by way of a system bus or other electrical communication paths. In one illustrative configuration, one or more central processing units ("CPUs") 1104 operate in conjunction with a chipset 1106. The CPUs 1104 may be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 may provide an interface to a random-access memory (RAM) 1108, used as the main memory in the computer 1100. The chipset 1106 may further provide an interface to a computer-readable storage medium such as a read-only memory ("ROM") 1110 or non-volatile RAM ("NVRAM") for storing basic routines that help to startup the computer 1100 and to transfer information between the various components and devices. The ROM 1110 or NVRAM may also store other software components necessary for the operation of the computer 1100 in accordance with the configurations described herein.

The computer 1100 may operate in a networked environment using logical connections to remote computing devices and computer systems through a network, such as the LAN 908. The chipset 1106 may include functionality for providing network connectivity through a network interface controller (NIC) 1112, such as a gigabit Ethernet adapter. The NIC 1112 is capable of connecting the computer 1100 to other computing devices over the LAN 908 (or the network(s) 908). It should be appreciated that multiple NICs 1112 may be present in the computer 1100, connecting the computer 1100 to other types of networks and remote computer systems.

The computer 1100 may be connected to a mass storage device 1114 that provides non-volatile storage for the computer 1100. The mass storage device 1114 may store an operating system, programs, and/or components including, without limitation, the transcription service 110 that generates the transcripts 146, as described herein, and data, which have been described in greater detail herein. The mass storage device 1114 may be connected to the computer 1100 through a storage controller 1118 connected to the chipset 1106. The mass storage device 1114 may consist of one or more physical storage units. The storage controller 1118 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 1100 may store data on the mass storage device 1114 by transforming the physical state of the physical storage units to reflect the information being stored. The specific transformation of physical state may depend on various factors, in different embodiments of this description. Examples of such factors may include, but are not limited to, the technology used to implement the physical storage units, whether the mass storage device 1114 is characterized as primary or secondary storage, and the like.

For example, the computer 1100 may store information to the mass storage device 1114 by issuing instructions through the storage controller 1118 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 may further read information from the mass storage device 1114 by detecting the physical states or characteristics of one or more particular locations within the physical storage units.

In addition to the mass storage device 1114 described above, the computer 1100 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 1100. In some examples, the operations performed by the service provider network 902, and or any components and/or services included therein, may be carried out by the processor(s) 128 and/or 130.

By way of example, and not limitation, as discussed herein, memory, such as the memory 124 and/or 132, or computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that may be used to store the desired information in a non-transitory fashion. The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof.

As mentioned briefly above, the mass storage device 1114 may store an operating system utilized to control the operation of the computer 1100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system may comprise the UNIX operating system or one of its variants. It should be appreciated that other operating systems may also be utilized. The mass storage device 1114 may store other system or application programs and data utilized by the computer 1100.

In one embodiment, the mass storage device 1114 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes described above with regard to FIGS. 3-7. The computer 1100 may also include computer-readable storage media having instructions stored thereupon for performing any of the other computer-implemented operations described herein.

The computer 1100 may also include one or more input/output controllers 1118 for receiving and processing input from a number of input devices, such as a keyboard, a mouse, a touchpad, a touch screen, an electronic stylus, or other type of input device. Similarly, an input/output controller 1118 may provide output to a display, such as a computer monitor, a flat-panel display, a digital projector, a printer, or other type of output device. It will be appreciated that the computer 1100 might not include all of the components shown in FIG. 10, may include other components that are not explicitly shown in FIG. 10, or might utilize an architecture completely different than that shown in FIG. 10.

While various examples and embodiments are described individually herein, the examples and embodiments may be combined, rearranged, and modified to arrive at other variations within the scope of this disclosure.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A system comprising:
one or more processors; and
one or more non-transitory computer-readable media storing computer-executable instructions that, when executed by the one or more processors, cause the one or more processors to perform acts comprising:
receiving first audio data generated by a first microphone of a first device that is communicatively coupled to a second device for engaging in a meeting, the first audio data representing first speech of a first participant within a first environment of the first device;
receiving second audio data generated by a second microphone of the first device, the second audio data representing second speech of a second participant within the first environment, wherein the first audio data further represents the second speech and the second audio data further represents the first speech;
receiving, from the second device, third audio data representing third speech of a third participant within a second environment of the second device;
determining, based at least in part on a first similarity between the first audio data and a first stored audio signature, a first identifier of the first participant;
determining, based at least in part on a second similarity between the second audio data and a second stored audio signature, a second identifier of the second participant;
determining, based at least in part on a third similarity between the third audio data and a third stored audio signature, a third identifier of the third participant;
determining that the first speech within the first audio data is detected at a first increased energy level compared to the second speech;
determining that the second speech within the second audio data is detected at a second increased energy level compared to the first speech;
processing the first audio data, using the second audio data, to generate fourth audio data that attenuates the second speech within the first audio data;
processing the second audio data, using the first audio data, to generate fifth audio data that attenuates the first speech within the second audio data;
generating first data associated with a transcript of the meeting, the first data including:
first words corresponding to the first speech of the first participant, the first words being associated with the first identifier,
second words corresponding to the second speech of the second participant, the second words being associated with the second identifier, and
third words corresponding to the third speech of the third participant;
analyzing the transcript to determine one or more action items associated with at least one of the first participant, the second participant, or the third participant; and
sending second data associated with the one or more action items to the at least one of the first participant, the second participant, or the third participant.

2. The system of claim 1, the acts further comprising:
generating, based at least in part on the third audio data, a first audio signature associated with the first participant; and
generating, based at least in part on the fourth audio data, a second audio signature associated with the second participant, wherein:
the first audio signature is compared against the first stored audio signature to determine the first similarity, and
the second audio signature is compared against the second stored audio signature to determine the second similarity.

3. The system of claim 1, the acts further comprising:
determining, based at least in part on the first similarity, a first participant profile that includes the first identifier corresponding to a first identity of the first participant; and
determining, based at least in part on the second similarity, a second participant profile that includes the second identifier corresponding to a second identity of the second participant.

4. A method comprising:
receiving, from a device, first audio data representing first speech of a first participant and second speech of a second participant;
receiving, from the device, second audio data representing the first speech and the second speech;
generating third audio data that represents the first speech by attenuating the second speech from at least one of the first audio data or the second audio data;
generating fourth audio data that represents the second speech by attenuating the first speech from at least one of the first audio data or the second audio data;
generating, based at least in part on the third audio data, a first audio signature associated with the first participant;

analyzing the first audio signature relative to a first stored audio signature to determine a first similarity between the first audio signature and the first stored audio signature;

determining that the first similarity satisfies a first confidence threshold;

based at least in part on the first similarity satisfying the first confidence threshold, a first profile associated with the first stored audio signature, the first profile including a first identifier of the first participant;

associating the first speech with the first identifier;

generating, based at least in part on the fourth audio data, a second audio signature associated with the second participant;

analyzing the second audio signature relative to a second stored audio signature to determine a second similarity between the second audio signature and the second stored audio signature;

determining that the second similarity satisfies a second confidence threshold;

determining, based at least in part on the second similarity satisfying the second confidence threshold, a second profile associated with the second stored audio signature, the second profile including a second identifier of the second participant;

associating the second speech with the second identifier; and generating, based at least in part on the third audio data and the fourth audio data, a transcript that indicates (i) the first speech in association with the first identifier and (ii) the second speech in association with the second identifier.

5. The method of claim 4, further comprising:

receiving, from a second device, fifth audio data representing third speech of a third participant;

generating, based at least in part on the fifth audio data, a third audio signature associated with the third participant;

analyzing the third audio signature relative to a third stored audio signature to determine a third similarity between the third audio signature and the third stored audio signature; and associating the third speech with a third identifier, wherein generating the transcript is further based at least in part on the fifth audio data and indicates the third speech in association with the third identifier.

6. The method of claim 4, wherein:

the first audio data is associated with a first audio signal generated by a first microphone of the device; and the second audio data is associated with a second audio signal generated by a second microphone of the device.

7. The method of claim 4, further comprising:

identifying, within the first audio data, the first speech at a first increased energy level as compared to the second speech; and identifying, within the second audio data, the second speech at second increased energy level as compared to the first speech.

8. The method of claim 7, wherein:

generating the third audio data is based at least in part on identifying the first speech at the first increased energy level within the first audio data; and generating the fourth audio data is based at least in part on identifying the second speech at the second increased energy level within the second audio data.

9. The method of claim 7, wherein the first audio data is associated with a first audio signal generated by a first microphone of the device and the second audio data is associated with a second audio signal generated by a second microphone of the device, further comprising:

associating the first microphone with the first participant based at least in part on identifying the first speech within the first audio data at the first increased energy level; and associating the second microphone of the device with the second participant based at least in part on identifying the second speech within the second audio data at the second increased energy level.

10. The method of claim 4, further comprising:

causing, at the device, output of a command associated with determining a first identity of the first participant; and receiving fifth audio data indicating the first identity, wherein generating the first audio signature is based at least in part on the fifth audio data.

11. The method of claim 4, further comprising:

sending, to a second device associated with the first participant, first data associated with the transcript; and sending, to a third device associated with the second participant, second data associated with the transcript.

12. The method of claim 4, further comprising:

receiving, from the device, fifth audio data representing third speech; and determining, based at least in part on at least one of the first audio signature or the first stored audio signature, that the third speech is associated with the first participant, wherein the transcript indicates the third speech in association with the first identifier.

13. The method of claim 4, further comprising:

associating a first microphone of the device with the first participant based at least in part on identifying the first speech within first audio signal at a first increased energy level, and associating a second microphone of the device with the second participant based at least in part on identifying the second speech within a second audio signal at a second increased energy level.

14. The method of claim 13, wherein:

associating the first microphone with the first participant is based at least in part on at least one of:
the first microphone being located closest to the first participant within an environment; or
detecting the first speech at an increased energy or signal level as compared to the second speech; and associating the second microphone with the second participant is based at least in part on at least one of:
the second microphone being located closets to the second participant within the environment; or
detecting the second speech at an increased energy or signal level as compared to the first speech.

15. A method comprising:

receiving, from a device within an environment, a first processed audio signal;

receiving, from the device, a second processed audio signal;

generating, based at least in part on the first processed audio signal and the second processed audio signal, first audio data that represents first speech of a first participant within the environment by attenuating second speech of a second participant within the environment from the first processed audio signal;

generating, based at least in part on the first processed audio signal and the second processed audio signal, second audio data that represents the second speech by attenuating the first speech of the first participant from the second processed audio signal;

generating, based at least in part on the first audio data, an audio signature associated with the first participant;

determining a similarity between the audio signature and a stored audio signature;

determining that the similarity satisfies a threshold;

determining, based at least in part on the similarity satisfying the threshold, an identifier associated with the stored audio signature;

associating the identifier with the first speech; and generating, based at least in part on the first audio data and the second audio data, a transcript that includes the first speech and the second speech, wherein the first speech is associated with the identifier.

16. The method of claim 15, wherein:

generating the first audio data is based at least in part on identifying, within the first processed audio signal, the first speech at a first increased energy level; and generating the second audio data is based at least in part on identifying, within the second processed audio signal, the second speech at a second increased energy level.

17. The method of claim 15, further comprising:

generating, based at least in part on the second processed audio signal, a second audio signature associated with the second participant;

determining a second similarity between the second audio signature and a second stored audio signature;

determining that the second similarity satisfies a second threshold; and determining, based at least in part on the second similarity, a second identifier associated with the second stored audio signature.

18. The method of claim 15, wherein the first processed audio signal is associated with the first speech and the second speech captured at a first microphone of the device, and the second processed audio signal is associated with the first speech and the second speech captured at a second microphone of the device, further comprising:

associating the first microphone with the first participant; and associating the second microphone with the second participant.

19. The method of claim 15, further comprising:

receiving, from a second device, third audio data representing third speech of a third participant;

generating, based at least in part on the third audio data, a third audio signature associated with the third participant;

analyzing the third audio signature relative to a third stored audio signature to determine a third similarity between the third audio signature and the third stored audio signature; and associating the third speech with a third identifier, wherein generating the transcript is further based at least in part on the third audio data and indicates the third speech in association with the third identifier.

20. The method of claim 15, further comprising:

causing, at the device, output of a command associated with determining a first identity of the first participant; and receiving third audio data indicating the first identity, wherein generating the audio signature is further based at least in part on the third audio data.

* * * * *